United States Patent
Takeuchi et al.

(10) Patent No.: US 12,501,008 B2
(45) Date of Patent: Dec. 16, 2025

(54) PROJECTION IMAGE ADJUSTMENT METHOD, PROJECTION SYSTEM, AND NON-TRANSITORY COMPUTER-READABLE STORAGE MEDIUM STORING INFORMATION PROCESSING PROGRAM

(71) Applicant: SEIKO EPSON CORPORATION, Tokyo (JP)

(72) Inventors: Kota Takeuchi, Azumino (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 18/384,958

(22) Filed: Oct. 30, 2023

(65) Prior Publication Data
US 2024/0146889 A1 May 2, 2024

(30) Foreign Application Priority Data
Oct. 31, 2022 (JP) .................. 2022-174171

(51) Int. Cl.
*H04N 9/31* (2006.01)
*G06T 7/70* (2017.01)

(52) U.S. Cl.
CPC ............. *H04N 9/3185* (2013.01); *G06T 7/70* (2017.01); *G06T 2207/30244* (2013.01)

(58) Field of Classification Search
CPC ... G06T 2207/30244; G06T 7/70; G06T 7/33; G06T 7/337; H04N 9/3194; H04N 9/3185; H04N 9/3147
See application file for complete search history.

(56) References Cited

U.S. PATENT DOCUMENTS

| | | | |
|---|---|---|---|
| 9,866,820 B1 * | 1/2018 | Agrawal | H04N 13/239 |
| 2005/0012907 A1 | 1/2005 | Inoue | |
| 2010/0103386 A1 | 4/2010 | Kubota | |
| 2014/0111536 A1 | 4/2014 | Shinozaki | |
| 2016/0014385 A1 * | 1/2016 | Sano | H04N 9/3185 348/571 |
| 2023/0127730 A1 * | 4/2023 | Johnson | H04N 9/3194 353/69 |
| 2024/0146885 A1 * | 5/2024 | Takeuchi | H04N 9/3185 |

FOREIGN PATENT DOCUMENTS

| | | |
|---|---|---|
| JP | 2005-039558 A | 2/2005 |
| JP | 2011-217403 A | 10/2011 |
| JP | 2016-042653 A | 3/2016 |
| JP | 2017-169204 A | 9/2017 |

* cited by examiner

*Primary Examiner* — Michael E Teitelbaum
*Assistant Examiner* — Humam M Satti
(74) *Attorney, Agent, or Firm* — Oliff PLC

(57) ABSTRACT

A projection image adjustment method includes: acquiring a first captured image corresponding to a first device including a first lens by capturing an image of a plane projection surface on which a first pattern image including at least four unit images is projected from a first projection device; acquiring a second captured image corresponding to a second device including a second lens by capturing an image of the projection surface; acquiring, based on the first captured image and the second captured image, a projective transformation matrix indicating transformation from a first coordinate system in a first device to a second coordinate system in a second device; and acquiring a plane parameter of the projection surface by using the projective transformation matrix.

6 Claims, 12 Drawing Sheets

PROJECTION IMAGE ADJUSTMENT METHOD, PROJECTION SYSTEM, AND NON-TRANSITORY COMPUTER-READABLE STORAGE MEDIUM STORING INFORMATION PROCESSING PROGRAM

The present application is based on, and claims priority from JP Application Serial Number 2022-174171, filed Oct. 31, 2022, the disclosure of which is hereby incorporated by reference herein in its entirety.

BACKGROUND

1. Technical Field

The present disclosure relates to a projection image adjustment method, a projection system, and a non-transitory computer-readable storage medium storing an information processing program.

2. Related Art

When a projector projects a projection image onto a projection surface to display a display image, a technique of estimating, by the projector, a three-dimensional shape of the projection surface and a position of the projection surface with respect to the projector may be used.

For example, JP-A-2016-042653 discloses a technique of measuring a three-dimensional position of a projection surface with respect to each of a plurality of projectors based on parameters acquired by using a projection unit and an imaging unit incorporated in the projector. In the technique, in addition to internal parameters of a projection optical system and internal parameters of an imaging optical system, parameters corresponding to abase line length of triangulation are stored in a storage device in advance.

In the technique according to JP-A-2016-042653, as described above, each of the projectors needs to store various parameters in advance. When an external imaging device is used instead of the imaging unit incorporated in each projector, parameters corresponding to the baseline length of the triangulation change according to a disposition position of the imaging device. However, in the technique according to JP-A-2016-042653, it is difficult for each projector to store the changing parameters in advance. Therefore, a user needs to calibrate parameters related to a positional relationship between devices. In addition, convenience for the user may decrease.

SUMMARY

A projection image adjustment method according to an aspect of the present disclosure includes: acquiring a first captured image corresponding to a first device including a first lens by capturing an image of a plane projection surface on which a first pattern image including at least four unit images is projected from a first projection device; acquiring a second captured image corresponding to a second device including a second lens by capturing an image of the projection surface; acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device; acquiring a plane parameter of the projection surface by using the projective transformation matrix; and projecting a projection image adjusted based on the plane parameter from the first projection device onto the projection surface. At least one of the first device and the second device is an imaging device.

A projection system according to an aspect of the present disclosure includes: a first projection device; a first device including a first lens and configured to generate a first captured image by capturing an image of a plane projection surface on which a first pattern image including at least four unit images is projected from the first projection device; a second device including a second lens and configured to generate a second captured image by capturing an image of the projection surface; and a processing device that is configured to acquire the first captured image, acquire the second captured image, and acquire, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device, includes a fourth acquirer configured to acquire a plane parameter of the projection surface by using the projective transformation matrix, and is configured to project a projection image adjusted based on the plane parameter from the first projection device onto the projection surface. At least one of the first device and the second device is an imaging device.

Anon-transitory computer-readable storage medium stores an information processing program according to an aspect of the present disclosure, and the information processing program causes a computer to execute operations including: acquiring a first captured image corresponding to a first device including a first lens by capturing an image of a plane projection surface on which a first pattern image including at least four unit images is projected from a first projection device; acquiring a second captured image corresponding to a second device including a second lens by capturing an image of the projection surface; acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device; acquiring a plane parameter of the projection surface by using the projective transformation matrix; and projecting a projection image adjusted based on the plane parameter from the first projection device onto the projection surface. At least one of the first device and the second device is an imaging device.

DESCRIPTION OF EMBODIMENTS

Figure 1:
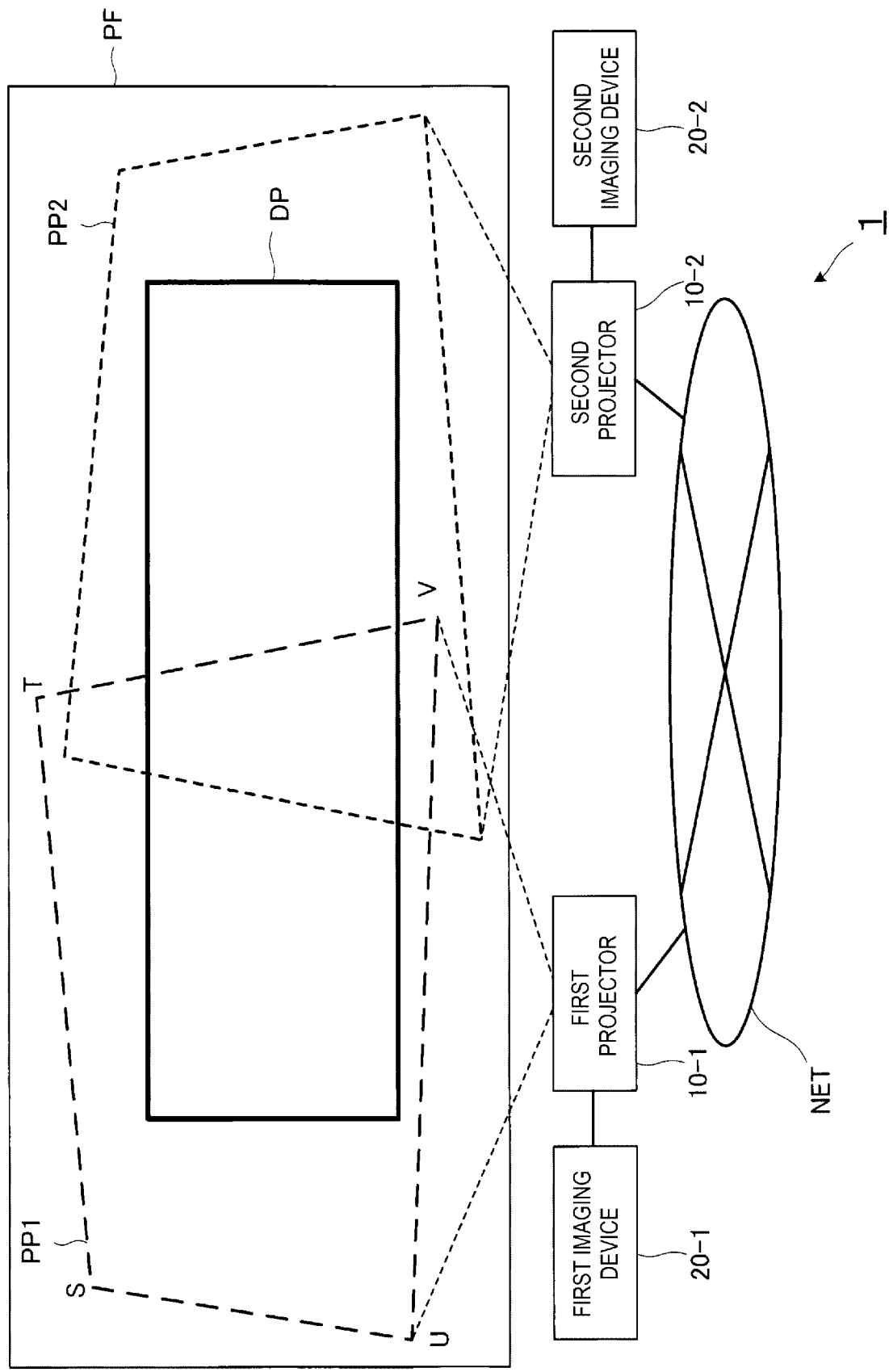
FIG. 1 is a block diagram showing a configuration of a projection system 1.

Hereinafter, an embodiment according to the present disclosure will be described with reference to the drawings. Here, in the drawings, a dimension and a scale of each part are appropriately different from an actual one. Further, the embodiments to be described below are preferred specific examples of the present disclosure, and thus various technically preferable limitations are attached. However, the scope of the present disclosure is not limited to these aspects unless it is stated in the following description that the present disclosure is particularly limited.

1: First Embodiment

1-1: Overall Configuration

FIG. 1 is a block diagram showing a configuration of a projection system 1 according to a first embodiment. The projection system 1 includes a first projector 10-1, a second projector 10-2, a first imaging device 20-1, and a second imaging device 20-2. The first projector 10-1 and the second projector 10-2 are communicably coupled to each other via a communication network NET. The first imaging device 20-1 and the first projector 10-1 are communicably coupled. Similarly, the second imaging device 20-2 and the second projector 10-2 are communicably coupled. A captured image captured by the second imaging device 20-2 is output to the first projector 10-1 via the second projector 10-2. The first imaging device 20-1 may be coupled to the communication network NET instead of being directly coupled to the first projector 10-1. In this case, a captured image captured by the first imaging device 20-1 is output to the first projector 10-1 via the communication network NET. Similarly, the second imaging device 20-2 may be coupled to the communication network NET instead of being directly coupled to the second projector 10-2. In this case, the captured image captured by the second imaging device 20-2 is output to the first projector 10-1 via the communication network NET. The "first imaging device 20-1" is an example of a "first device". The "second imaging device 20-2" is an example of a "second device".

The first projector 10-1 and the second projector 10-2 display a display image by projecting projection images onto a projection surface such as a wall surface or a screen. In the embodiment, the first projector 10-1 and the second projector 10-2 perform tiling display. Specifically, the first projector 10-1 projects a projection image PP1 onto a projection surface PF. Further, the second projector 10-2 projects a projection image PP2 onto the projection surface PF. On the projection surface PF, the projection image PP1 and the projection image PP2 partially overlap each other. A single display image DP is displayed in an entire region that is a sum of a region of the projection image PP1 and a region of the projection image PP2. A part of the display image DP is included in the projection image PP1, and the other part of the display image DP is included in the projection image PP2. The part of the display image DP included in the projection image PP1 and the part of the display image DP included in the projection image PP2 are partially superimposed, and thus the single display image DP is displayed on the projection surface PF.

In the embodiment, it is assumed that the first projector 10-1 and the second projector 10-2 are placed substantially horizontally.

The first imaging device 20-1 captures an image of the projection surface PF. Similarly, the second imaging device 20-2 captures an image of the projection surface PF. The first projector 10-1 can acquire a three-dimensional shape of the projection surface PF based on the captured image of the projection surface PF captured by the first imaging device 20-1 and the captured image of the projection surface PF captured by the second imaging device 20-2. That is, it can be said that the first imaging device 20-1 and the second imaging device 20-2 measure the three-dimensional shape of the projection surface PF as a sensor 20. The first imaging device 20-1 includes a "first lens" as the "first device". Similarly, the second imaging device 20-2 includes a "second lens" as the "second device". The first projector 10-1 may acquire the three-dimensional shape of the projection surface PF by using one stereo camera or one time of flight (TOF) camera instead of the first imaging device 20-1 and the second imaging device 20-2.

The first projector 10-1 adjusts an outer shape of the projection image PP1 projected from the first projector 10-1 and an outer shape of the projection image PP2 projected from the second projector 10-2 by using measurement data related to the three-dimensional shape of the projection surface PF. As a result, the display image DP is displayed in a state of not rotating within the projection surface PF. In particular, in the embodiment, when the display image DP is rectangular, the display image DP has one side orthogonal to a vertical direction in the projection surface PF and the other side orthogonal to a horizontal direction in the projection surface PF.

1-2: Configuration of First Projector

Figure 2:
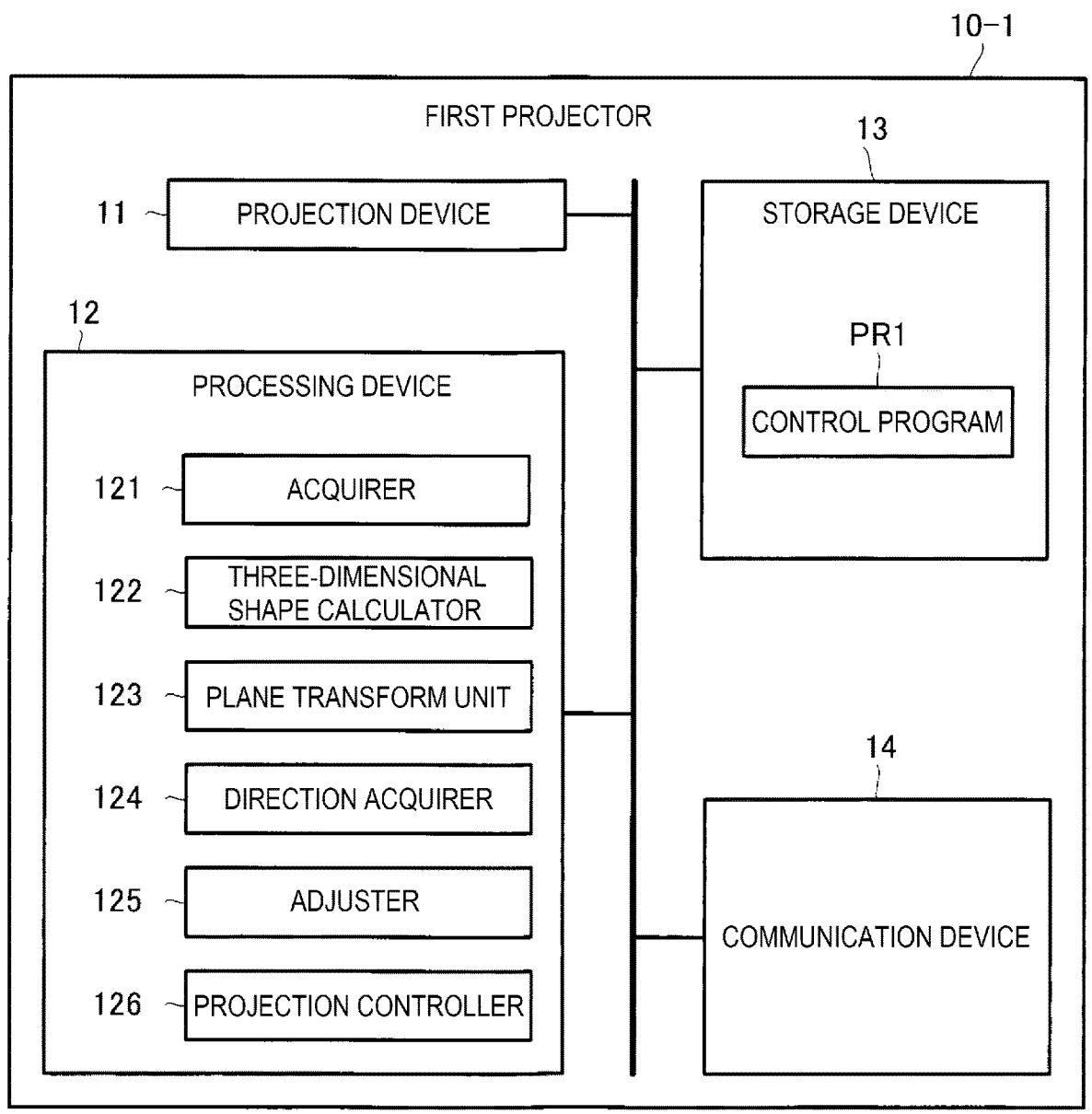
FIG. 2 is a block diagram showing a configuration of a first projector 10-1.

FIG. 2 is a block diagram showing a configuration of the first projector 10-1. The first projector 10-1 includes a projection device 11, a processing device 12, a storage device 13, and a communication device 14. Elements of the first projector 10-1 are coupled with one another by a single bus or a plurality of buses for information communication. In addition, each element of the first projector 10-1 may be implemented by a single or a plurality of devices, and some elements of the first projector 10-1 may be omitted.

The projection device 11 is a device that projects the projection image PP1 onto the projection surface PF such as a wall or a screen. The projection device 11 projects various images under control of the processing device 12. As to be described later with reference to FIG. 3, the projection device 11 includes, for example, an illumination device 140, a liquid crystal panel 160, and a projection lens system 183, and modulates light from the illumination device 140 by using the liquid crystal panel 160. Further, the projection device 11 projects the modulated light onto the projection surface PF via the projection lens system 183.

The processing device 12 is a processor that controls the entire first projector 10-1 and includes, for example, a single or a plurality of chips. The processing device 12 is implemented by, for example, a central processing unit (CPU) including an interface with a peripheral device, an arithmetic device, a register, and the like. Apart or all of functions of the processing device 12 may be implemented by hardware such as a digital signal processor (DSP), an application specific integrated circuit (ASIC), a programmable logic device (PLD), and a field programmable gate array (FPGA). The processing device 12 executes various types of processing in parallel or sequentially.

The storage device 13 is a storage medium readable by the processing device 12 and stores a plurality of programs including a control program PR1 executed by the processing device 12. For example, the storage device 13 may be implemented by at least one of a read only memory (ROM), an erasable programmable ROM (EPROM), an electrically erasable programmable ROM (EEPROM), and a random access memory (RAM). The storage device 13 may be referred to as a register, a cache, a main memory, or a main storage device.

The communication device 14 is hardware serving as a transmission and reception device for communicating with another device. The communication device 14 is also referred to as, for example, a network device, a network controller, a network card, or a communication module. The communication device 14 may include a connector for wired connection and an interface circuit corresponding to the connector. Further, the communication device 14 may include a wireless communication interface. Examples of the connector for wired connection and the interface circuit include those conforming to a wired local area network (LAN), IEEE 1394, and a universal serial bus (USB). Examples of the wireless communication interface include those conforming to a wireless LAN or Bluetooth (registered trademark).

Figure 3:
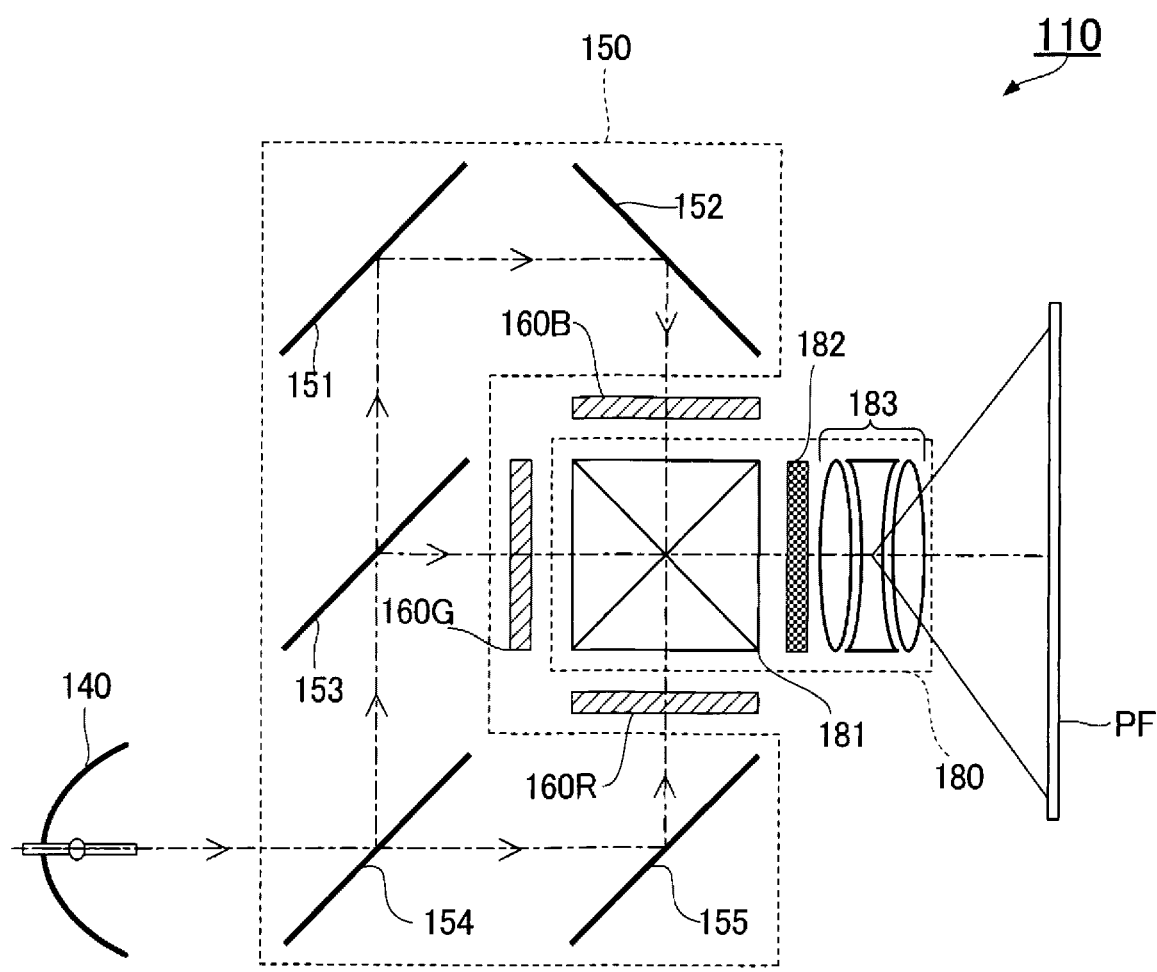
FIG. 3 is an explanatory diagram showing an example of an optical system 110.

FIG. 3 is an explanatory view showing an example of an optical system 110 included in the projection device 11. The optical system 110 includes the illumination device 140, a separation optical system 150, three liquid crystal panels 160R, 160G, and 160B, and a projection optical system 180. Hereinafter, the liquid crystal panels 160R, 160G, and 160B may be collectively referred to as the liquid crystal panel 160. The liquid crystal panel 160 is an example of a "display panel".

The illumination device 140 includes a white light source such as a halogen lamp.

The separation optical system 150 includes three mirrors 151, 152, and 155, and dichroic mirrors 153 and 154 therein. The separation optical system 150 separates white light, which is visible light emitted from the illumination device 140, into three primary colors including red, green, and blue. Hereinafter, "red" is referred to as "R", "green" is referred to as "G", and "blue" is referred to as "B".

For example, the white light emitted from the illumination device 140 is separated into light components of three primary colors including light in an R wavelength range, light in a G wavelength range, and light in a B wavelength range by the mirrors 151, 152, and 155 and the dichroic mirrors 153 and 154 disposed inside the separation optical system 150. The light in the R wavelength range is guided to the liquid crystal panel 160R, the light in the G wavelength range is guided to the liquid crystal panel 160G, and the light in the B wavelength range is guided to the liquid crystal panel 160B.

Specifically, the dichroic mirror 154 transmits the light in the R wavelength range and reflects the light in the G and B wavelength ranges in the white light. The dichroic mirror 153 transmits the light in the B wavelength range and reflects the light in the G wavelength range in the light in the G and B wavelength ranges reflected by the dichroic mirror 154.

Here, each of the liquid crystal panels 160R, 160G, and 160B is used as a spatial light modulator. Each of the liquid crystal panels 160R, 160G, and 160B includes, for example, data lines of 800 columns, scanning lines of 600 rows, and pixels arranged in a matrix of 800 columns in the horizontal direction and 600 rows in the vertical direction. In each pixel, a polarization state of transmission light, which is emission light with respect to incident light, is controlled according to gradation. The numbers of scanning lines, data lines, and pixels of the liquid crystal panels 160R, 160G, and 160B described above are merely examples and are not limited to the examples described above.

The projection optical system 180 includes a dichroic prism 181, an optical path shift element 182, and the projection lens system 183. The light modulated by the liquid crystal panels 160R, 160G, and 160B enters the dichroic prism 181 from three directions. In the dichroic prism 181, the light in the R wavelength range and the light in the B wavelength range are refracted at 90 degrees and the light in the G wavelength range goes straight. Accordingly, images of the primary colors including R, G, and B are synthesized.

The light emitted from the dichroic prism 181 passes through the optical path shift element 182 and reaches the projection lens system 183. For example, the optical path shift element 182 is disposed between the dichroic prism 181 and the projection lens system 183.

The projection lens system 183 enlarges and projects the light emitted from the optical path shift element 182, specifically, a composite image onto the projection surface PF such as a screen. The liquid crystal panels 160R, 160G, and 160B receive the light corresponding to the corresponding primary colors including R, G, and B through the dichroic mirrors 153 and 154, respectively.

The optical system 110 shown in FIG. 3 is merely an example. The optical system 110 may include, for example, a DMD panel instead of the liquid crystal panel 160.

In FIG. 2, the processing device 12 functions as an acquirer 121, a three-dimensional shape calculator 122, a plane transform unit 123, a direction acquirer 124, an adjuster 125, and a projection controller 126 by reading and executing the control program PR1 from the storage device 13. The control program PR1 may be transmitted, via the communication network NET, from another device such as a server that manages the first projector 10-1.

The acquirer 121 acquires a pattern image and the projection images PP1 and PP2 from the storage device 13. The acquirer 121 further acquires, via the communication device 14, the captured image captured by the second imaging device 20-2 from the second projector 10-2.

The three-dimensional shape calculator 122 calculates parameters related to the three-dimensional shape of the projection surface PF viewed from the first imaging device 20-1. In other words, the three-dimensional shape calculator 122 calculates and acquires three-dimensional plane parameters of the projection surface PF for the first imaging device 20-1. The "three-dimensional plane parameters of the projection surface PF" are coefficients a, b, and c when the projection surface PF is expressed by an expression ax+by+cz=1 in a three-dimensional coordinate system that is an XYZ coordinate system on the captured image captured by the first imaging device 20-1.

Figure 4:
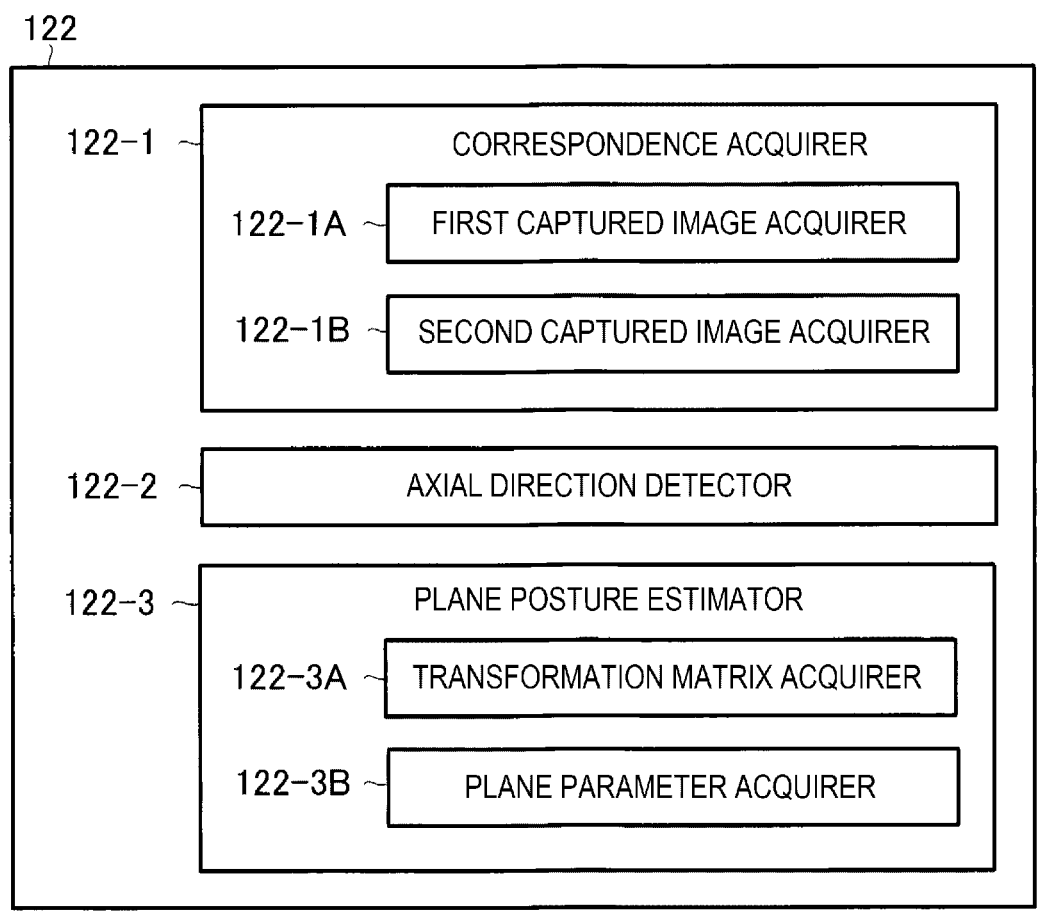
FIG. 4 is a functional block diagram showing functions of a three-dimensional shape calculator 122.

FIG. 4 is a functional block diagram showing functions of the three-dimensional shape calculator 122. The three-dimensional shape calculator 122 includes a correspondence acquirer 122-1, an axial direction detector 122-2, and a plane posture estimator 122-3. The correspondence acquirer 122-1 includes a first captured image acquirer 122-1A and a second captured image acquirer 122-1B. The plane posture estimator 122-3 includes a transformation matrix acquirer 122-3A and a plane parameter acquirer 122-3B. The first captured image acquirer 122-1A is an example of a "first acquirer". The second captured image acquirer 122-1B is an example of a "second acquirer".

The correspondence acquirer 122-1 acquires a correspondence between a camera image coordinate system of the first imaging device 20-1 and a panel image coordinate system of the projection device 11 included in the first projector 10-1, and a correspondence between the camera image coordinate system of the first imaging device 20-1 and a panel image coordinate system of the projection device 11 included in the second projector 10-2. In the present specification, the camera image coordinate system of the first imaging device 20-1 is referred to as a "first camera image coordinate system". Similarly, a camera image coordinate system in the second imaging device 20-2 is referred to as a "second camera image coordinate system". In the present specification, the panel image coordinate system of the projection device 11 included in the first projector 10-1 is referred to as a "first panel image coordinate system". Similarly, the panel image coordinate system of the projection device 11 included in the second projector 10-2 is referred to as a "second panel image coordinate system". In other words, the correspondence acquirer 122-1 acquires the correspondence between the first camera image coordinate system and the first panel image coordinate system and the correspondence between the first camera image coordinate system and the second panel image coordinate system.

More specifically, the first projector 10-1 projects the pattern image acquired by the acquirer 121 onto the projection surface PF. Examples of the pattern image include a checkered pattern, a Gaussian dot pattern, and a circular pattern. The first imaging device 20-1 captures an image of the pattern image projected onto the projection surface PF. The first captured image acquirer 122-1A included in the correspondence acquirer 122-1 acquires a captured image of the pattern image captured by the first imaging device 20-1. The correspondence acquirer 122-1 executes pattern detection on the captured image. For example, when the pattern image is a checkered pattern, the correspondence acquirer 122-1 acquires coordinate values of a grid on the checkered pattern. When the pattern image is a Gaussian dot, the correspondence acquirer 122-1 acquires coordinate values of a portion having a maximum luminance. When the pattern image is a circular pattern, the correspondence acquirer 122-1 acquires coordinate values of a center of a circle. The correspondence acquirer 122-1 acquires a correspondence between the coordinate values on the captured image and the coordinate values on the liquid crystal panel 160 included in the first projector 10-1. That is, the correspondence acquirer 122-1 acquires a correspondence between the coordinate values in the first camera image coordinate system and the coordinate values in the first panel image coordinate system.

Similarly, the second projector 10-2 projects a pattern image onto the projection surface PF. The first captured image acquirer 122-1A included in the correspondence acquirer 122-1 acquires a captured image of the pattern image captured by the first imaging device 20-1. The correspondence acquirer 122-1 executes pattern detection on the captured image. The correspondence acquirer 122-1 acquires a correspondence between coordinate values in the first camera image coordinate system and coordinate values in the second panel image coordinate system based on the pattern detection.

The second captured image acquirer 122-1B included in the correspondence acquirer 122-1 acquires a captured image of a pattern image captured in the same manner by the second imaging device 20-2. The correspondence acquirer 122-1 executes pattern detection on the captured image. Based on the pattern detection, the correspondence acquirer 122-1 acquires a correspondence between coordinate values in the second camera image coordinate system and coordinate values in the first panel image coordinate system and a correspondence between the coordinate values in the second camera image coordinate system and the coordinate values in the second panel image coordinate system.

The correspondence acquirer 122-1 acquires, for each of the first imaging device 20-1 and the second imaging device 20-2, a correspondence between coordinate values in a camera image coordinate system and coordinate values in a panel image coordinate system of a projector in which the display image DP displayed by projecting a projection image PP onto the projection surface PF is included in an imaging range, among all the projectors.

The axial direction detector 122-2 detects a panel horizontal central axis direction that is a direction of an axis corresponding to a horizontal central axis in the panel image coordinate system in a camera image coordinate system.

Specifically, the axial direction detector 122-2 acquires where at least two points on a horizontal central axis, which is an axis in the vertical direction passing through an optical center, are located in the camera image coordinate system on the liquid crystal panel 160 included in the first projector 10-1. On the liquid crystal panel 160, the horizontal central axis passes through an intersection between an optical axis of the projection lens system 183 and the liquid crystal panel 160. The liquid crystal panel 160 has two sides parallel to the horizontal central axis and two sides perpendicular to the horizontal central axis.

When the axial direction detector 122-2 acquires two points on the horizontal central axis which is the axis in the vertical direction passing through the optical center on the liquid crystal panel 160 included in the first projector 10-1, the axial direction detector 122-2 sets a vector that is directed from a top to a bottom on the horizontal central axis coupling the two points corresponding thereto in the camera image coordinate system and has a length normalized to 1 as a panel horizontal central axis direction vector in the camera image coordinate system. On the other hand, when the axial direction detector 122-2 acquires three or more points on the horizontal central axis which is the axis in the vertical direction passing through the optical center on the liquid crystal panel 160 included in the first projector 10-1, the axial direction detector 122-2 sets a vector that is directed from the top to the bottom on a straight line obtained by linear approximation using a method such as a least squares method for a point group of the three or more points and has a length normalized to 1 as the panel horizontal central axis direction vector in the camera image coordinate system.

The plane posture estimator 122-3 estimates a posture of the projection surface PF with respect to the first imaging device 20-1. As described above, the plane posture estimator 122-3 includes the transformation matrix acquirer 122-3A and the plane parameter acquirer 122-3B. The transformation matrix acquirer 122-3A is an example of a "third acquirer". The plane parameter acquirer 122-3B is an example of a "fourth acquirer".

The transformation matrix acquirer 122-3A transforms coordinate values of corresponding points in the first camera image coordinate system that are used when the correspondence acquirer 122-1 acquires the correspondence into coordinate values in a first camera normalized coordinate system that is the normalized coordinate system of the first imaging device 20-1. Here, the "normalized coordinate system" is a coordinate system on an XY plane passing through a point having a length of 1 in a depth direction from an optical origin in an optical axis of the first imaging device 20-1. In the normalized coordinate system, image distortion due to a camera lens is removed. The normalized coordinate system has an optical center as an origin on the captured image captured by the first imaging device 20-1. In addition, the transformation matrix acquirer 122-3A transforms coordinate values of corresponding points in the second camera image coordinate system used by the correspondence acquirer 122-1 into coordinate values in a second camera normalized coordinate system that is a normalized coordinate system of the second imaging device 20-2.

Further, the transformation matrix acquirer 122-3A calculates and acquires a projective transformation matrix from the first camera normalized coordinate system to the second camera normalized coordinate system by using the coordinate values of the first camera normalized coordinate system and the coordinate values of the second camera normalized coordinate system. When coordinates of a point in the first camera normalized coordinate system are $(x_1, y_1)$ and coordinates of a point in the second camera normalized coordinate system corresponding to the point are $(x_2, y_2)$, a projective transformation matrix H is expressed by the following Expression (1).

$$p\begin{pmatrix} x_1 \\ y_1 \\ 1 \end{pmatrix} = H\begin{pmatrix} x_2 \\ y_2 \\ 1 \end{pmatrix} = \begin{pmatrix} h_{00} & h_{01} & h_{02} \\ h_{10} & h_{11} & h_{12} \\ h_{20} & h_{21} & h_{22} \end{pmatrix}\begin{pmatrix} x_2 \\ y_2 \\ 1 \end{pmatrix} \quad (1)$$

Here, p is a constant of $p = h_{20}x_2 + h_{21}y_2 + h_{22}$, and is a numerical value different for coordinates of each corresponding point. To obtain the projective transformation matrix H, at least four pairs of coordinate values of the corresponding points are required. Therefore, the pattern image includes at least four unit images. Here, the "unit image" is, for example, a lattice on a checkered pattern, a Gaussian dot, or a circle. Among the four or more pairs of coordinate values of the corresponding points, each pair of coordinate values of the corresponding points are coordinate values when the same point on a three-dimensional plane is imaged by the first imaging device 20-1 and the second imaging device 20-2.

In a first captured image captured by the first imaging device 20-1, coordinate values obtained by transforming four pairs of coordinate values of the corresponding points corresponding to the four unit images into coordinate values in the first camera normalized coordinate system in the first imaging device 20-1 are an example of a "first transformation coordinate value group". In a second captured image captured by the second imaging device 20-2, coordinate values obtained by transforming four pairs of coordinate values of corresponding points corresponding to the four unit images into coordinate values in the second camera normalized coordinate system in the second imaging device 20-2 are an example of a "second transformation coordinate value group".

The plane parameter acquirer 122-3B acquires plane parameters of the projection surface PF by using the projective transformation matrix H.

By performing singular value decomposition on the projective transformation matrix H, a position and a posture of the second imaging device 20-2 at three-dimensional coordinates with respect to the first imaging device 20-1 and the three-dimensional plane parameters of the projection surface PF with respect to the first imaging device 20-1 are calculated. However, according to the singular value decomposition, two solutions are derived as a set of the position and the posture at the three-dimensional coordinates of the second imaging device 20-2 with respect to the first imaging device 20-1 and the three-dimensional plane parameters of the projection surface PF with respect to the first imaging device 20-1. Therefore, the plane parameter acquirer 122-3B selects a solution in which the position of the second imaging device 20-2 with respect to the first imaging device 20-1 indicated by each of the two solutions is closer to a position included in layout information indicating disposition of the first imaging device 20-1 and the second imaging device 20-2.

Here, the "layout information" indicates, for example, a positional relationship in an up-down direction or a positional relationship in a left-right direction between the first imaging device 20-1 and the second imaging device 20-2. A direction from the first imaging device 20-1 to the second imaging device 20-2 is an example of a "first direction".

As described above, since the first projector 10-1 and the second projector 10-2 are used for tiling, the first projector 10-1 and the second projector 10-2 are arranged side by side in the left-right direction or the up-down direction. Therefore, the plane parameter acquirer 122-3B can acquire the positional relationship between the first projector 10-1 and the second projector 10-2 by comparing projection center coordinates of each of the first projector 10-1 and the second projector 10-2 on the captured image. Further, when the first imaging device 20-1 is attached to the first projector 10-1 and the second imaging device 20-2 is attached to the second projector 10-2, the plane parameter acquirer 122-3B can calculate the positional relationship between the first imaging device 20-1 and the second imaging device 20-2 based on the positional relationship between the first projector 10-1 and the second projector 10-2.

For example, the first imaging device 20-1 captures an image of the projection surface PF on which the pattern image is projected from the projection device 11 included in the first projector 10-1. Further, the first imaging device 20-1 captures an image of the projection surface PF on which the pattern image is projected from the projection device 11 included in the second projector 10-2. Here, the pattern image projected from the projection device 11 included in the first projector 10-1 is an example of a "first pattern image". The pattern image projected from the projection device 11 included in the second projector 10-2 is an example of a "second pattern image". The captured image obtained by capturing an image of the projection surface PF onto which the first pattern image is projected by the first imaging device 20-1 is an example of the "first captured image". A captured image obtained by capturing an image of the projection surface PF onto which the second pattern image is projected by the first imaging device 20-1 is an example of a "third captured image". Based on the first captured image and the third captured image, the plane parameter acquirer 122-3B acquires the first direction indicating the direction from the first pattern image to the second pattern image in a captured image coordinate system that defines a position in the captured image captured by the first imaging device 20-1.

The layout information may be layout information stored in the storage device 13 of the first projector 10-1. Further, the layout information basically indicates the positional relationship between the first imaging device 20-1 and the second imaging device 20-2. However, as described above, when the first imaging device 20-1 is attached to the first projector 10-1 and the second imaging device 20-2 is attached to the second projector 10-2, the layout information may be layout information indicating the disposition of the first projector 10-1 and the second projector 10-2. Further, the layout information may be information manually set by a user of the projection system 1. In other words, the first projector 10-1 may receive an operation of designating the first direction from the user of the projection system 1.

Figure 5:
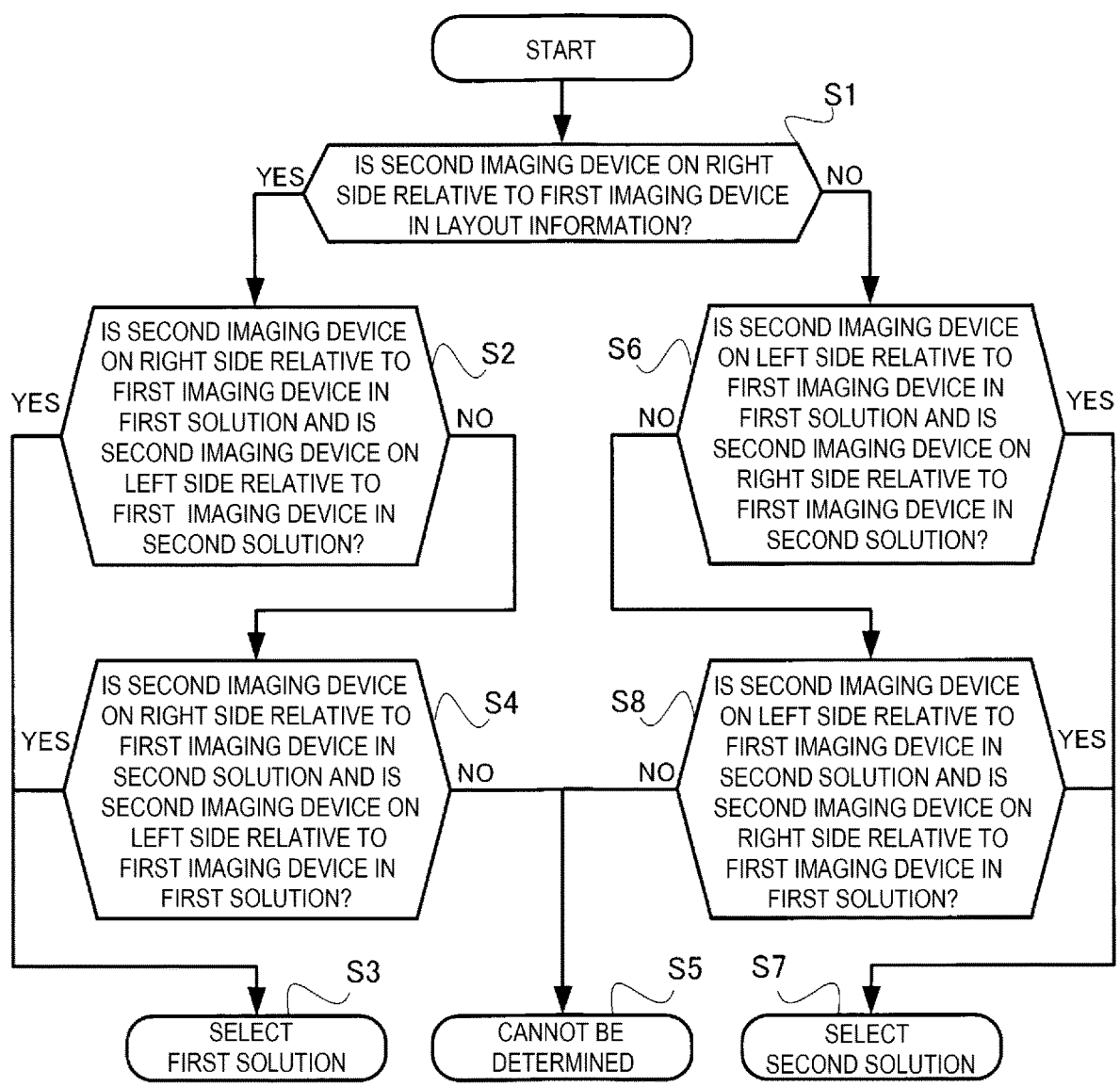
FIG. 5 is a flowchart showing a solution selection operation by a plane parameter acquirer 122-3B.

FIG. 5 is a flowchart showing a solution selection operation by the plane parameter acquirer 122-3B. Plane parameters of the projection surface PF with respect to the first imaging device 20-1 included in a first solution are $(a, b, c)=(a_A, b_A, c_A)$, and plane parameters of the projection surface PF with respect to the first imaging device 20-1 included in a second solution are $(a, b, c)=(a_B, b_B, c_B)$.

In step S1, the processing device 12 functions as the plane parameter acquirer 122-3B to determine whether the second imaging device 20-2 is on a right side relative to the first imaging device 20-1 when facing the projection surface PF in the layout information. If a determination result of step S1 is positive, that is, when the second imaging device 20-2 is located on the right side relative to the first imaging device 20-1 (YES in step S1), the processing device 12 executes processing of step S2. If the determination result of step S1 is negative, that is, when the second imaging device 20-2 is located on a left side relative to the first imaging device 20-1 (NO in step S1), the processing device 12 executes processing of step S6.

In step S2, the processing device 12 functions as the plane parameter acquirer 122-3B to determine whether the second imaging device 20-2 is on the right side relative to the first imaging device 20-1 when facing the projection surface PF in the first solution and the second imaging device 20-2 is on the left side relative to the first imaging device 20-1 when facing the projection surface PF in the second solution. If a determination result of step S2 is positive, that is, when the second imaging device 20-2 is on the right side relative to the first imaging device 20-1 when facing the projection surface PF in the first solution and the second imaging device 20-2 is on the left side relative to the first imaging device 20-1 when facing the projection surface PF in the second solution (YES in step S2), the processing device 12 executes processing of step S3. On the other hand, when the determination result of step S2 is negative, that is, when the second imaging device 20-2 is on the left side relative to the first imaging device 20-1 when facing the projection surface PF in the first solution, or when the second imaging device 20-2 is on the right side relative to the first imaging device 20-1 when facing the projection surface PF in the second solution (NO in step S2), the processing device 12 executes processing of step S4.

In step S3, the processing device 12 functions as the plane parameter acquirer 122-3B to select the first solution. That is, the processing device 12 selects $(a, b, c)=(a_A, b_A, c_A)$ as the plane parameters of the projection surface PF with respect to the first imaging device 20-1.

In step S4, the processing device 12 functions as the plane parameter acquirer 122-3B to determine whether the second imaging device 20-2 is on the right side relative to the first imaging device 20-1 when facing the projection surface PF in the second solution and the second imaging device 20-2 is on the left side relative to the first imaging device 20-1 when facing the projection surface PF in the first solution. If a determination result of step S4 is positive, that is, when the second imaging device 20-2 is on the right side relative to the first imaging device 20-1 when facing the projection surface PF in the second solution and the second imaging device 20-2 is on the left side relative to the first imaging device 20-1 when facing the projection surface PF in the first solution (YES in step S4), the processing device 12 executes the processing of step S3. On the other hand, when the determination result of step S4 is negative, that is, when the second imaging device 20-2 is on the left side relative to the first imaging device 20-1 when facing the projection surface PF in the second solution, or when the second imaging device 20-2 is on the right side relative to the first imaging device 20-1 when facing the projection surface PF in the first solution (NO in step S4), the processing device 12 executes processing of step S5.

In step S5, the processing device 12 functions as the plane parameter acquirer 122-3B to determine that the positional relationship between the first imaging device 20-1 and the second imaging device 20-2 cannot be determined. In this case, the processing device 12 may stop the operation.

In step S6, the processing device 12 functions as the plane parameter acquirer 122-3B to determine whether the second imaging device 20-2 is on the left side relative to the first imaging device 20-1 when facing the projection surface PF in the first solution and the second imaging device 20-2 is on the right side relative to the first imaging device 20-1 when facing the projection surface PF in the second solution. If a determination result of step S6 is positive, that is, when the second imaging device 20-2 is on the left side relative to the first imaging device 20-1 when facing the projection surface PF in the first solution and the second imaging device 20-2 is on the right side relative to the first imaging device 20-1 when facing the projection surface PF in the second solution (YES in step S6), the processing device 12 executes processing of step S7. On the other hand, when the determination result of step S6 is negative, that is, when the second imaging device 20-2 is on the right side relative to the first imaging device 20-1 when facing the projection surface PF in the first solution, or when the second imaging device 20-2 is on the left side relative to the first imaging device 20-1 when facing the projection surface PF in the second solution (NO in step S6), the processing device 12 executes processing of step S8.

In step S7, the processing device 12 functions as the plane parameter acquirer 122-3B to select the second solution. That is, the processing device 12 selects $(a, b, c)=(a_B, b_B, c_B)$ as the plane parameters of the projection surface PF with respect to the first imaging device 20-1.

In step S8, the processing device 12 functions as the plane parameter acquirer 122-3B to determine whether the second imaging device 20-2 is on the left side relative to the first imaging device 20-1 when facing the projection surface PF in the second solution and the second imaging device 20-2 is on the right side relative to the first imaging device 20-1 when facing the projection surface PF in the first solution. If a determination result of step S8 is positive, that is, when the second imaging device 20-2 is on the left side relative to the first imaging device 20-1 when facing the projection surface PF in the second solution and the second imaging device 20-2 is on the right side relative to the first imaging device 20-1 when facing the projection surface PF in the first solution (YES in step S8), the processing device 12 executes the processing of step S7. On the other hand, when the determination result of step S8 is negative, that is, when the second imaging device 20-2 is on the right side relative to the first imaging device 20-1 when facing the projection surface PF in the second solution, or when the second imaging device 20-2 is on the left side relative to the first imaging device 20-1 when facing the projection surface PF in the first solution (NO in step S8), the processing device 12 executes the processing of step S5.

In other words, the processing device 12 acquires the plane parameters of the projection surface PF indicated by the first solution when a direction from the first imaging device 20-1 to the second imaging device 20-2, which is indicated by the first solution, matches the first direction and a direction from the first imaging device 20-1 to the second imaging device 20-2, which is indicated by the second solution, does not match the first direction.

In FIG. 2, the plane transform unit 123 transforms a two-dimensional panel horizontal central axis direction vector in the camera image coordinate system detected by the axial direction detector 122-2 into a three-dimensional panel horizontal central axis direction vector on the projection surface PF by using the plane parameters of the projection surface PF acquired by the plane posture estimator 122-3. Specifically, the plane transform unit 123 transforms a two-dimensional panel horizontal central axis direction vector according to the first projector 10-1 on the first camera image coordinate system into a two-dimensional panel horizontal central axis direction vector according to the first projector 10-1 on the first camera normalized coordinate system by using internal parameters of the first imaging device 20-1. The transformation processing is the same transformation processing as the transformation processing executed by the plane posture estimator 122-3. Further, the plane transform unit 123 transforms the two-dimensional panel horizontal central axis direction vector according to the first projector 10-1 into a three-dimensional panel horizontal central axis direction vector according to the first projector 10-1 on the projection surface PF by using the plane parameters of the projection surface PF with respect to the first imaging device 20-1. Specifically, when there is a plane satisfying ax+by +cz=1 in a three-dimensional coordinate system having an optical center of the first imaging device 20-1 as an origin and coordinate values of a point obtained by observing a point (X, Y, Z) on the plane in the first camera normalized coordinate system are $(x_1, y_1)$, the following Expression (2) is satisfied.

$$\begin{pmatrix} X \\ Y \\ Z \end{pmatrix} = \frac{1}{ax_1 + by_1 + c} \begin{pmatrix} x_1 \\ y_1 \\ 1 \end{pmatrix} \quad (2)$$

Therefore, the plane transform unit 123 can calculate three-dimensional coordinates (X, Y, Z) corresponding to the coordinate values $(x_1, y_1)$ in a two-dimensional camera normalized coordinate system based on the coordinate values $(x_1, y_1)$ in the two-dimensional camera normalized coordinate system and the plane parameters (a, b, c).

By using the same method, the plane transform unit 123 transforms a two-dimensional panel horizontal central axis direction vector according to the second projector 10-2 in the first camera image coordinate system into a three-dimensional panel horizontal central axis direction vector according to the second projector 10-2 on the projection surface PF.

Figure 6:
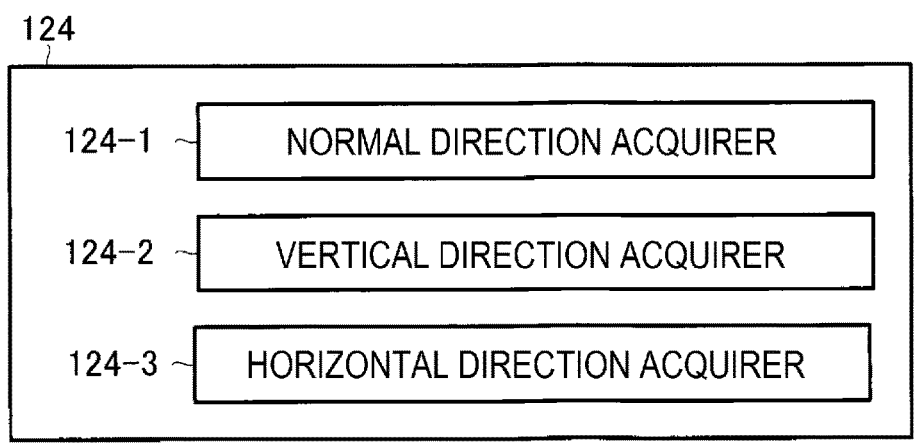
FIG. 6 is a functional block diagram showing functions of a direction acquirer 124.

The direction acquirer 124 calculates and acquires vectors in three directions orthogonal to one another on the projection surface PF. FIG. 6 is a functional block diagram showing functions of the direction acquirer 124. The direction acquirer 124 includes a normal direction acquirer 124-1, a vertical direction acquirer 124-2, and a horizontal direction acquirer 124-3.

The normal direction acquirer 124-1 acquires a normal direction of the projection surface PF by using the plane parameters acquired by the plane parameter acquirer 122-3B. As described above, when the plane parameters of the projection surface PF are (a, b, c), a normal vector $n(n_x, n_y, n_z)$ in the three-dimensional plane indicated by the expression of ax+by +cz=1 is calculated by the following Expression (3).

$$n(n_x, n_y, n_z) = \left( \frac{a}{\sqrt{a^2 + b^2 + c^2}}, \frac{b}{\sqrt{a^2 + b^2 + c^2}}, \frac{c}{\sqrt{a^2 + b^2 + c^2}} \right) \quad (3)$$

Figure 7:
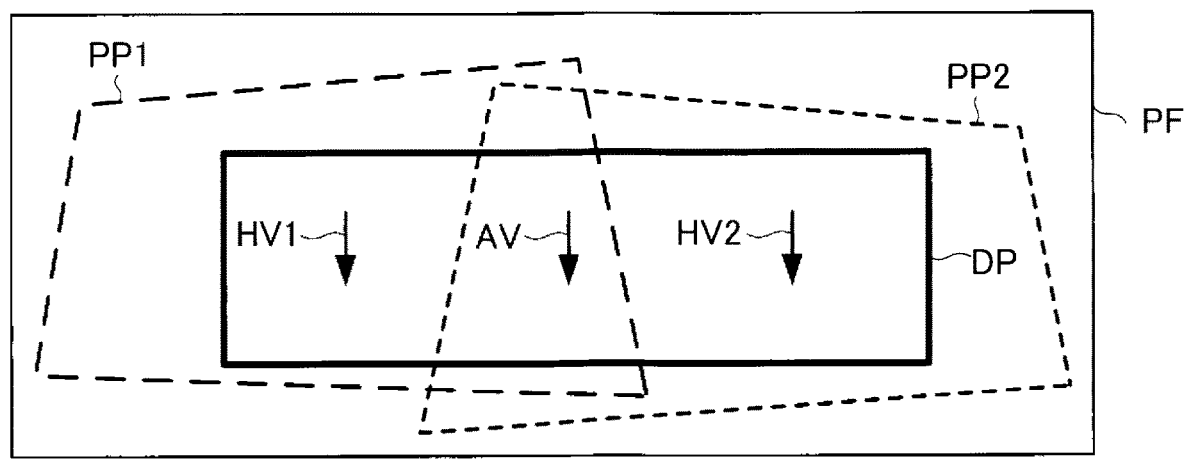
FIG. 7 is a diagram showing an example of a panel horizontal central axis direction vector HV1, a panel horizontal central axis direction vector HV2, and a vector AV that is an average of both.

The vertical direction acquirer 124-2 calculates a vector that is an average of the three-dimensional panel horizontal central axis direction vector according to the first projector 10-1 on the projection surface PF and the three-dimensional panel horizontal central axis direction vector according to the second projector 10-2 on the projection surface PF which are output from the plane transform unit 123. FIG. 7 is a diagram showing examples of a three-dimensional panel horizontal central axis direction vector HV1 according to the first projector 10-1 on the projection surface PF, a three-dimensional panel horizontal central axis direction vector HV2 according to the second projector 10-2 on the projection surface PF, and a vector AV that is an average of both.

Specifically, the vertical direction acquirer 124-2 calculates an average element of an element of the three-dimensional panel horizontal central axis direction vector HV1 according to the first projector 10-1 on the projection surface PF and an element of the three-dimensional panel horizontal central axis direction vector HV2 according to the second projector 10-2 on the projection surface PF. The vector AV having the average element of the elements of both panel horizontal central axis direction vectors HV is a vector in the vertical direction in the projection surface PF. The vector in the vertical direction in the projection surface PF is referred to as a "vertical vector" in the present specification. In the present specification, the vertical vector is expressed by an expression of $v(v_x, v_y, v_z)$. The vertical direction acquirer 124-2 acquires the vertical direction in the projection surface PF based on the vertical vector v.

As described above, the first projector 10-1 and the second projector 10-2 are provided substantially horizontally, but roll rotation components of both the projectors 10 are not 0. The vertical direction acquirer 124-2 compensates for roll rotation as much as possible by averaging the roll rotation components. Further, when the projection system 1 executes the tiling by using three or more projectors 10 instead of two projectors 10, variations in the roll rotation are further averaged, and the roll rotation is further compensated.

The horizontal direction acquirer 124-3 acquires the horizontal direction orthogonal to the normal direction and the vertical direction on the projection surface PF. Specifically, the horizontal direction acquirer 124-3 calculates an outer product of the normal vector $n(n_x, n_y, n_z)$ calculated by the normal direction acquirer 124-1 and the vertical vector $v(v_x, v_y, v_z)$ calculated by the vertical direction acquirer 124-2, and sets a vector obtained by normalizing the calculated vector as a horizontal vector $h(h_x, h_y, h_z)$.

Figure 8:
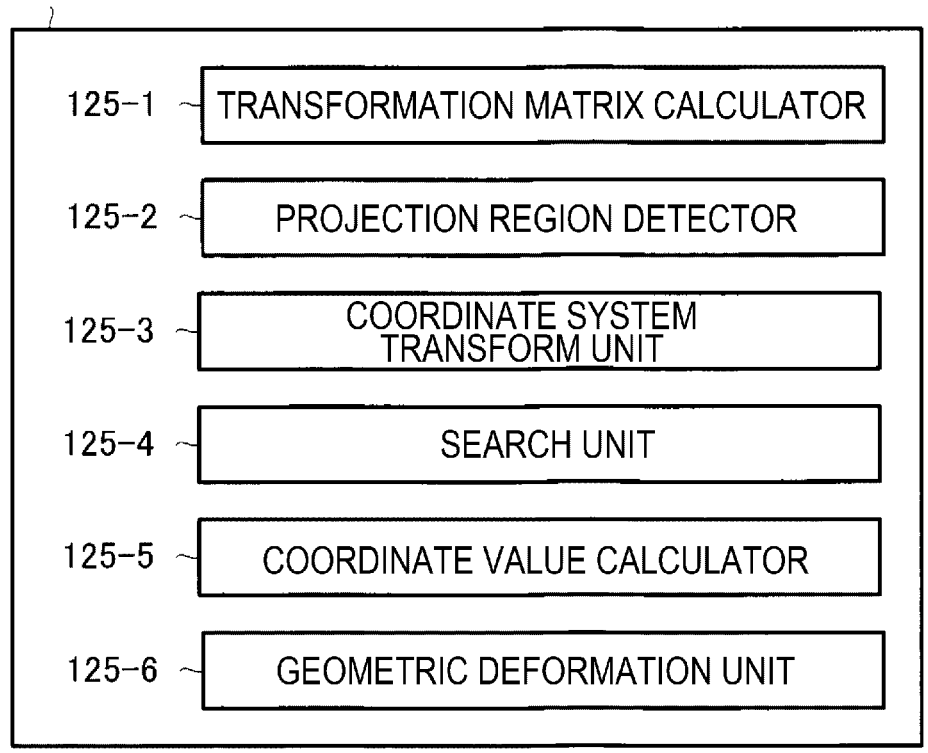
FIG. 8 is a functional block diagram showing functions of an adjuster 125.

In FIG. 2, the adjuster 125 adjusts shapes of the projection images PP1 and PP2 including a part of the display image DP such that the rectangular display image DP having one side orthogonal to the vertical direction and the other side orthogonal to the horizontal direction is displayed on the projection surface PF. FIG. 8 is a functional block diagram showing functions of the adjuster 125. The adjuster 125 includes a transformation matrix calculator 125-1, a projection region detector 125-2, a coordinate system transform unit 125-3, a search unit 125-4, a coordinate value calculator 125-5, and a geometric deformation unit 125-6.

The transformation matrix calculator 125-1 calculates a transformation matrix from a first camera coordinate system that is a three-dimensional coordinate system viewed from the first imaging device 20-1 to a three-dimensional coordinate system when the projection surface PF is viewed from a front surface. Specifically, the transformation matrix calculator 125-1 defines a 3×3 transformation matrix R having three vectors including the normal vector $n(n_x, n_y, n_z)$, the vertical vector $v(v_x, v_y, v_z)$, and the horizontal vector $h(h_x, h_y, h_z)$ as row vectors according to the following Expression (4).

$$R = \begin{pmatrix} h_x & h_y & h_z \\ v_x & v_y & v_z \\ n_x & n_y & n_z \end{pmatrix} \quad (4)$$

The coordinate system transform unit 125-3, which will be described later, can transform, by using the transformation matrix R, three-dimensional coordinate values of a point represented in the three-dimensional coordinate system viewed from the first imaging device 20-1 into three-dimensional coordinate values in a projection surface coordinate system that is the three-dimensional coordinate system when the projection surface PF is viewed from the front surface.

The projection region detector 125-2 detects a projection region of each projector 10 on the captured image captured by the first imaging device 20-1. Specifically, the projection region detector 125-2 extracts coordinate values of four grid points closest to coordinates corresponding to four corners of the liquid crystal panel 160 included in each projector 10 from coordinate values of a corresponding point group on the captured image captured by the first imaging device 20-1, which are acquired by the correspondence acquirer 122-1. A region surrounded by the four grid points substantially matches the projection region. The projection region detector 125-2 may calculate a projective transformation matrix between the first camera image coordinate system and the panel image coordinate system in each projector 10 in advance, and acquire the coordinate values of points at four corners without a margin by projecting the coordinate values of points of the four corners of the liquid crystal panel 160 onto the first camera image coordinate system.

The coordinate system transform unit 125-3 transforms coordinate values of the projection region in the first camera image coordinate system into coordinate values in the projection surface coordinate system. Specifically, the coordinate system transform unit 125-3 transforms the coordinate values of the points at the four corners of the projection region in the first camera image coordinate system into coordinate values of the points at the four corners of the projection region in the first camera normalized coordinate system by using the internal parameters of the first imaging device 20-1. The transformation processing is the same transformation processing as the transformation processing executed by the plane posture estimator 122-3. Further, the coordinate system transform unit 125-3 transforms the coordinate values of the points at the four corners of the projection region in the first camera normalized coordinate system into the coordinate values of the points at the four corners of the projection region in the first camera coordinate system by using the plane parameters (a, b, c). The transformation processing is the same transformation processing as the transformation processing executed by the plane transform unit 123. Further, the coordinate system transform unit 125-3 transforms the coordinate values of the points at the four corners of the projection region in the first camera coordinate system into the coordinate values of the points at the four corners of the projection region in the projection surface coordinate system by using the transformation matrix R. Specifically, when the coordinate values of the points at the four corners of the projection region in the first camera coordinate system are $(X_1, Y_1, Z_1)$, the coordinate system transform unit 125-3 calculates the coordinate values $(X_S, Y_S, Z_S)$ of the points at the four corners of the projection region in the three-dimensional projection surface coordinate system by the following Expression (5).

$$\begin{pmatrix} X_S \\ Y_S \\ Z_S \end{pmatrix} = R \begin{pmatrix} X_1 \\ Y_1 \\ Z_1 \end{pmatrix} \quad (5)$$

Finally, the coordinate system transform unit 125-3 extracts only $(X_S, Y_S)$, which are X and Y components, among $(X_S, Y_S, Z_S)$ to calculate the coordinate values of the points at the four corners of the projection region in a two-dimensional projection surface coordinate system. The two-dimensional projection surface coordinate system is a coordinate system in the projection surface PF.

Figure 9:
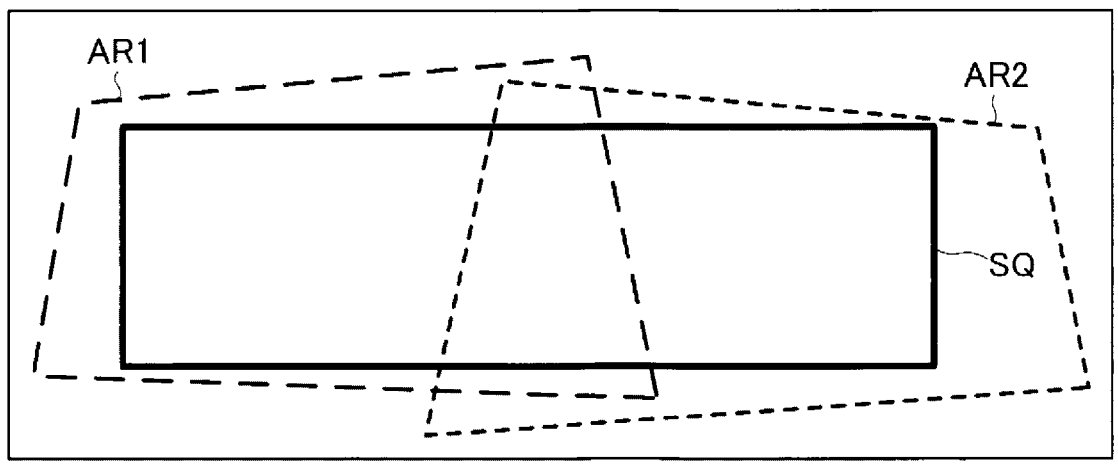
FIG. 9 is a diagram showing an example of a projection region AR1 of the first projector 10-1, a projection region AR2 of a second projector 10-2, and a rectangle SQ having a maximum area.

The search unit 125-4 searches the projection surface PF for a rectangle having a maximum area inscribed in an entire region that is a sum of a projection region of the first projector 10-1 and a projection region of the second projector 10-2. FIG. 9 is a diagram showing an example of a projection region AR1 of the first projector 10-1, a projection region AR2 of the second projector 10-2, and a rectangle SQ having a maximum area. The search unit 125-4 may draw a plurality of rectangles SQ in the entire region and select the rectangle SQ having the maximum area among the plurality of rectangles SQ. Alternatively, the search unit 125-4 may determine the rectangle SQ having the maximum area by using dynamic programming. An aspect ratio of the rectangle SQ searched for at this time may be designated by the user in advance. Alternatively, when there is no particular designation, the search unit 125-4 may determine the rectangle SQ having the maximum area in the entire region regardless of the aspect ratio. The search unit 125-4 stores, in the two-dimensional projection surface coordinate system, coordinates of four corners of the rectangle SQ determined by the above method as a corrected coupling region in the projection surface coordinate system.

Figure 10:
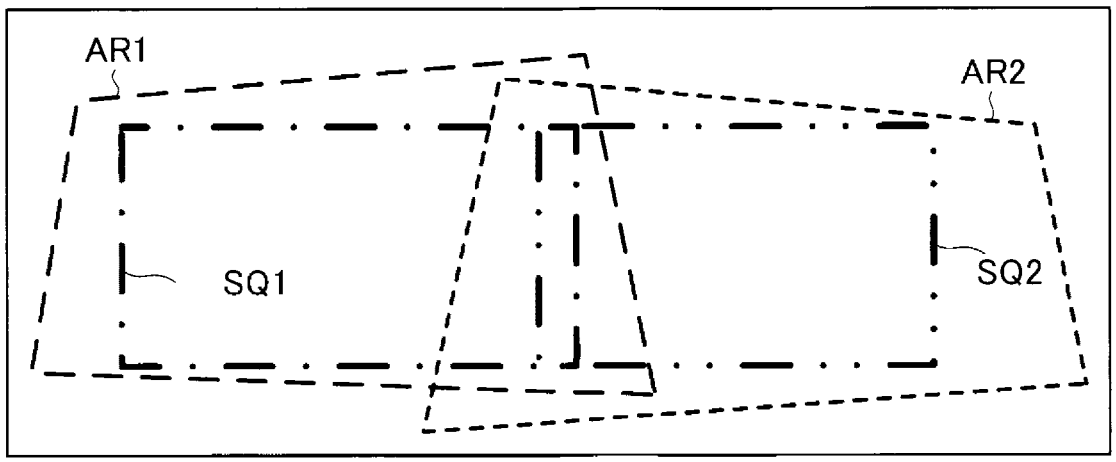
FIG. 10 is an explanatory diagram showing operations of a coordinate value calculator 125-5.
Figure 11:
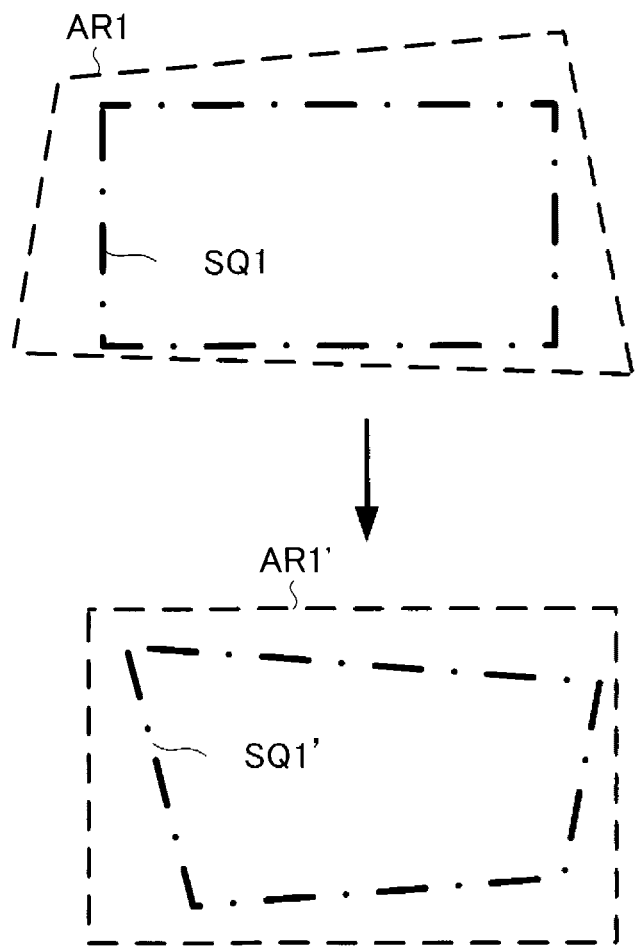
FIG. 11 is an explanatory diagram showing operations of the coordinate value calculator 125-5.
Figure 12:
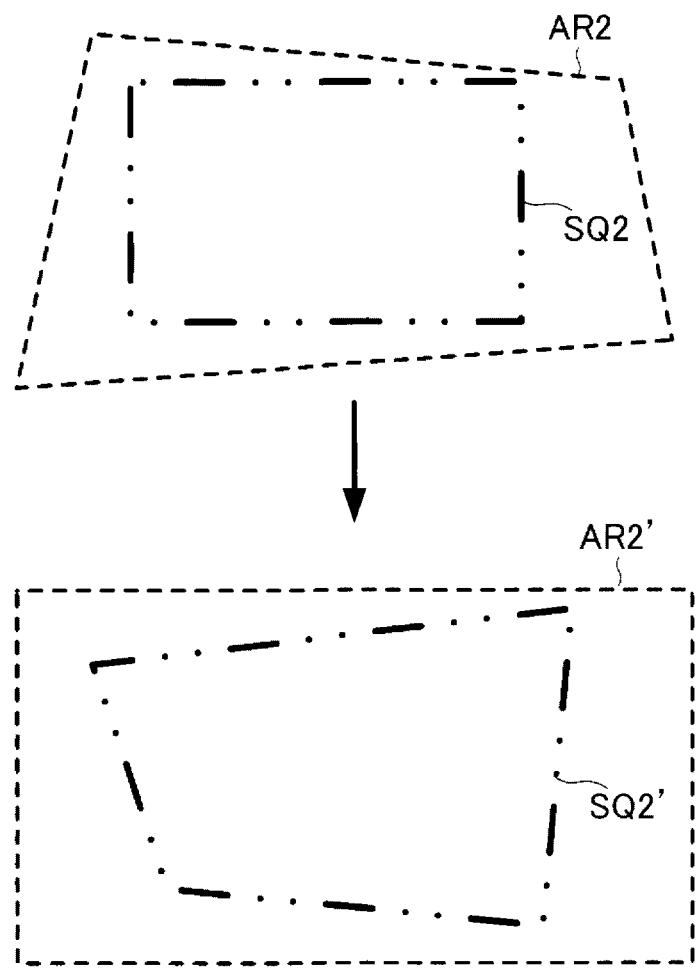
FIG. 12 is an explanatory diagram showing operations of the coordinate value calculator 125-5.

The coordinate value calculator 125-5 calculates coordinate values of the four corners of the corrected coupling region in the first panel image coordinate system of the first projector 10-1 and the second panel image coordinate system of the second projector 10-2 by using coordinate values of four corners of the corrected coupling region stored by the search unit 125-4. FIGS. 10 to 12 are explanatory diagrams showing operations of the coordinate value calculator 125-5.

First, as shown in FIG. 10, the coordinate value calculator 125-5 divides the rectangle SQ as the corrected coupling region shown in FIG. 9 into two rectangles SQ1 and SQ2 matching aspect ratios of the liquid crystal panels 160 of the first projector 10-1 and the second projector 10-2, respectively. At this time, the coordinate value calculator 125-5 ensures that a left side of the rectangle SQ1 coincides with a left side of the rectangle SQ and a right side of the rectangle SQ2 coincides with a right side of the rectangle SQ. Further, the coordinate value calculator 125-5 sets coordinates of four corners of each of the rectangle SQ1 and the rectangle SQ2 as corrected four-corner coordinates in the projection surface coordinate system.

Next, the coordinate value calculator 125-5 acquires coordinate values of four-corner coordinates of the projection region AR1 before correction in the first panel image coordinate system and coordinate values of four-corner coordinates of a projection region AR1' after correction in the projection surface coordinate system. At this time, the coordinate values of four-corner coordinates of the projection region AR1 before correction in the first panel image coordinate system can be obtained from panel resolution of the first projector 10-1.

Next, the coordinate value calculator 125-5 calculates a projective transformation matrix H 1 based on a correspondence between the coordinate values of four-corner coordinates of the projection region AR1 before correction in the first panel image coordinate system and the coordinate values of four-corner coordinates of the projection region AR1' after correction in the projection surface coordinate system. The projective transformation matrix H 1 is a projective transformation matrix from the projection surface coordinate system to the first panel image coordinate system.

Finally, as shown in FIG. 11, the coordinate value calculator 125-5 can calculate corrected four-corner coordinates of the rectangle SQ1' in the first panel image coordinate system, which are a final output, by projecting corrected four-corner coordinates of the rectangle SQ1 in the projection surface coordinate system to the first panel image coordinate system by using the projective transformation matrix $H_1$.

Similarly, the coordinate value calculator 125-5 acquires coordinate values of four-corner coordinates of the projection region AR2 before correction in the second panel image coordinate system and coordinate values of four-corner coordinates of the projection region AR2' after correction in the projection surface coordinate system. At this time, the coordinate values of four-corner coordinates of the projection region AR2 before correction in the second panel image coordinate system can be obtained from panel resolution of the second projector 10-2.

Next, the coordinate value calculator 125-5 calculates a projective transformation matrix $H_2$ based on a correspondence between the coordinate values of four-corner coordinates of the projection region AR2 before correction in the second panel image coordinate system and the coordinate values of four-corner coordinates of the projection region AR2' after correction in the projection surface coordinate system. The projective transformation matrix $H_2$ is a projective transformation matrix from the projection surface coordinate system to the second panel image coordinate system.

Finally, as shown in FIG. 12, the coordinate value calculator 125-5 can calculate corrected four-corner coordinates of the rectangle SQ2' in the second panel image coordinate system, which are a final output, by projecting corrected four-corner coordinates of the rectangle SQ2 in the projection surface coordinate system to the second panel image coordinate system by using the projective transformation matrix $H_2$.

In FIG. 8, the geometric deformation unit 125-6 geometrically deforms the projection image by using the corrected four-corner coordinates of the rectangle SQ1' and the corrected four-corner coordinates of the rectangle SQ2' which are calculated by the coordinate value calculator 125-5.

In FIG. 2, the projection controller 126 causes the projection device 11 to project the pattern image toward the projection surface PF. After outputting the pattern image to the second projector 10-2, the projection controller 126 causes the second projector 10-2 to project the pattern image toward the projection surface PF.

The projection controller 126 causes the projection device 11 to project the projection image adjusted by the adjuster 125 toward the projection surface PF. The projection controller 126 causes the second projector 10-2 to project the projection image adjusted by the adjuster 125 toward the projection surface PF after outputting the projection image to the second projector 10-2. Specifically, the projection controller 126 causes the projection device 11 to project a projection image corrected to a shape of the rectangle SQ1' shown in FIG. 11 toward the projection surface PF. Similarly, the projection controller 126 causes the second projector 10-2 to project the projection image corrected to a shape of the rectangle SQ2' shown in FIG. 12 toward the projection surface PF.

Although not shown, the first projector 10-1 has another function provided in a normal projector.

1-3: Configuration of Second Projector

Figure 13:
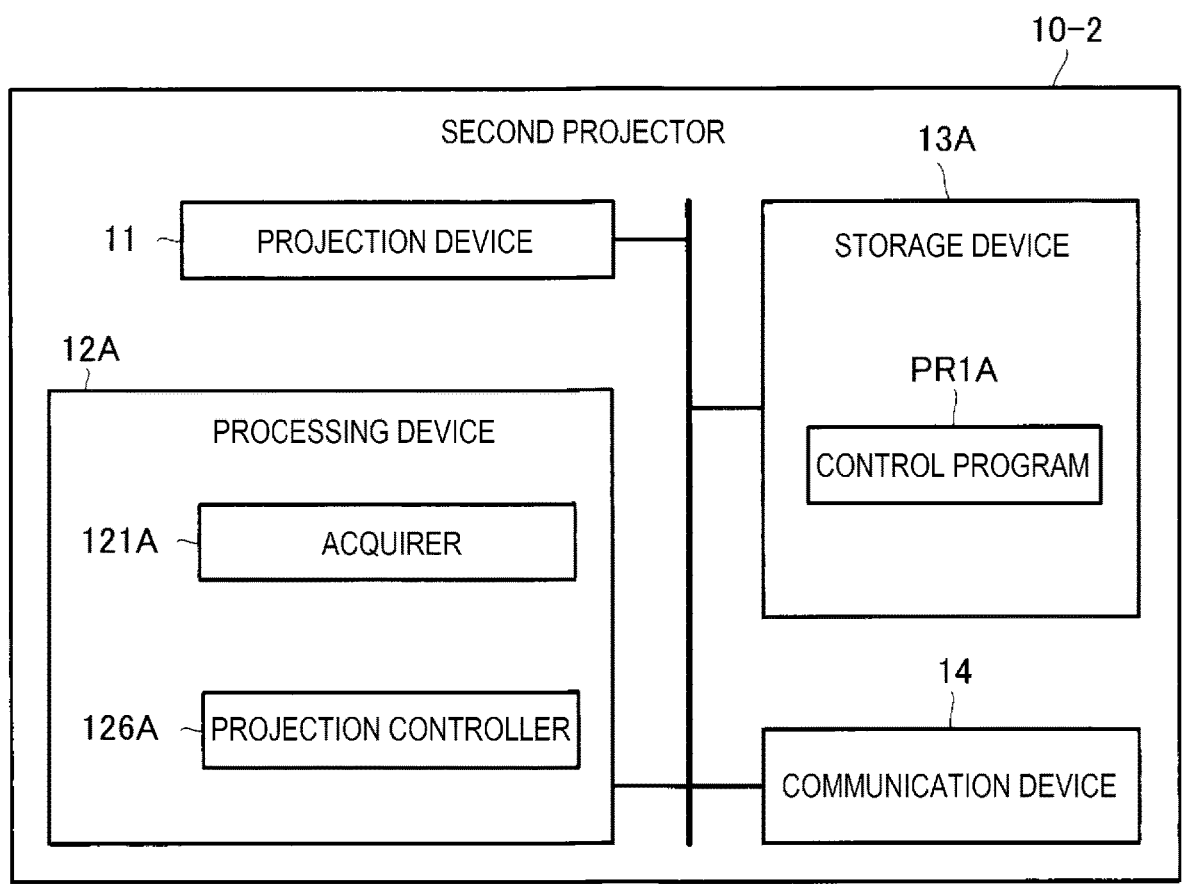
FIG. 13 is a block diagram showing a configuration of the second projector 10-2.

FIG. 13 is a block diagram showing a configuration of the second projector 10-2. To simplify the description, the same reference numerals are used for the same components as the components included in the first projector 10-1 among the components included in the second projector 10-2, and the detailed description of the functions thereof will be omitted. The second projector 10-2 includes the projection device 11, a processing device 12A, a storage device 13A, and the communication device 14. Elements of the second projector 10-2 are coupled with one another by a single bus or a plurality of buses for information communication. In addition, each element of the second projector 10-2 may be implemented by a single or a plurality of devices, and some elements of the second projector 10-2 may be omitted.

The processing device 12A is a processor that controls the entire second projector 10-2 and includes, for example, a single or a plurality of chips. The processing device 12A is implemented by, for example, a CPU including an interface with a peripheral device, an arithmetic device, a register, and the like. A part or all of functions of the processing device 12A may be implemented by hardware such as a DSP, an ASIC, a PLD, and a FPGA. The processing device 12A executes various types of processing in parallel or sequentially.

The storage device 13A is a storage medium readable by the processing device 12A and stores a plurality of programs including a control program PR1A executed by the processing device 12A. For example, the storage device 13A may be implemented by at least one of a ROM, an EPROM, an EEPROM, and a RAM. The storage device 13A may be referred to as a register, a cache, a main memory, or a main storage device.

The processing device 12A functions as an acquirer 121A and a projection controller 126A by reading and executing the control program PR1A from the storage device 13A. The control program PR1A may be transmitted, via the communication network NET, from another device such as a server that manages the second projector 10-2.

The acquirer 121A acquires the pattern image from the first projector 10-1 via the communication device 14. The acquirer 121A further acquires a projection image adjusted by the first projector 10-1 from the first projector 10-1 via the communication device 14.

The projection controller 126A causes the projection device 11 to project the pattern image acquired by the acquirer 121A toward the projection surface PF. Further, the projection controller 126A causes the projection device 11 to project the projection image acquired by the acquirer 121A and adjusted by the first projector 10-1 toward the projection surface PF.

1-4: Operation of Embodiment

Figure 14:
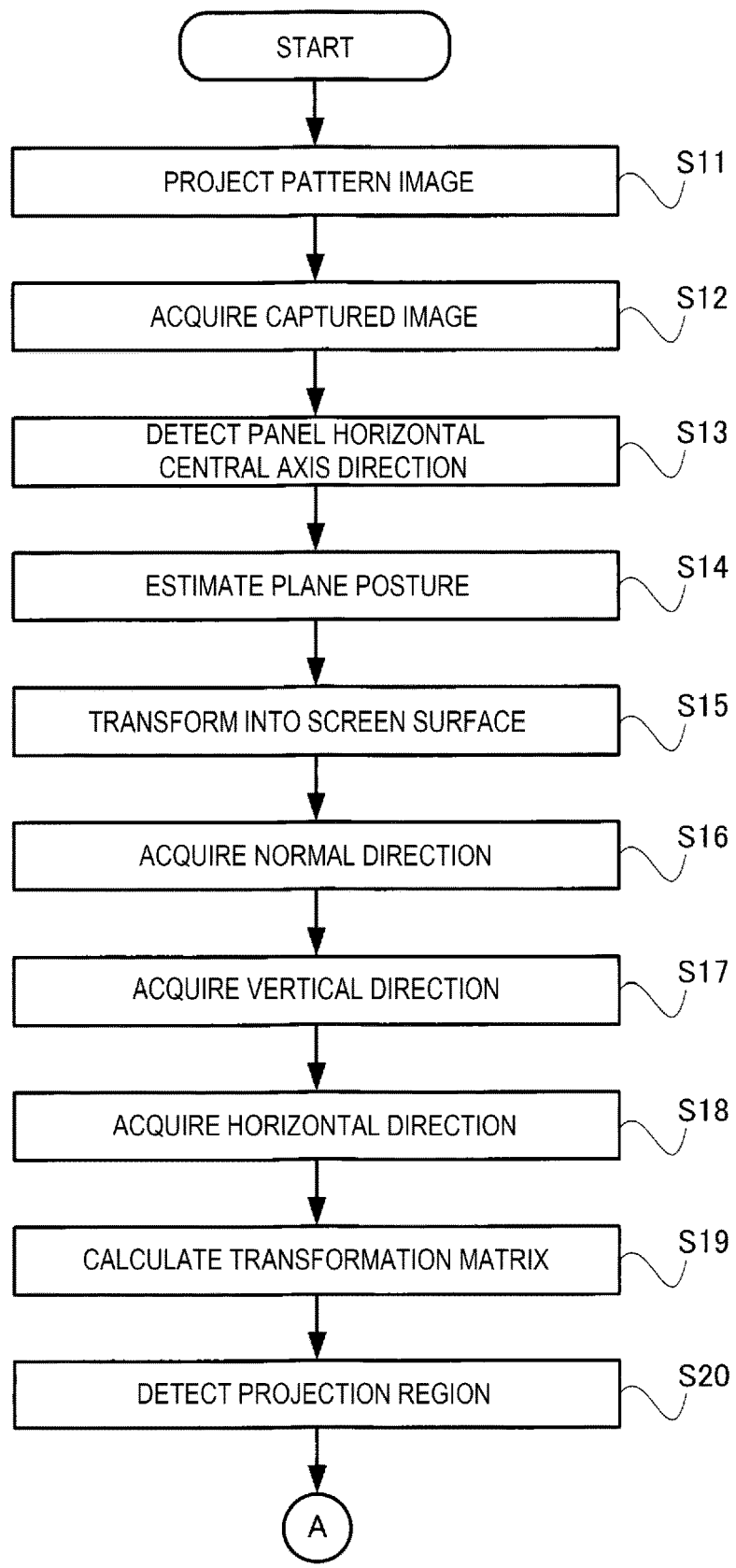
FIG. 14 is a flowchart showing operations of the first projector 10-1.
Figure 15:
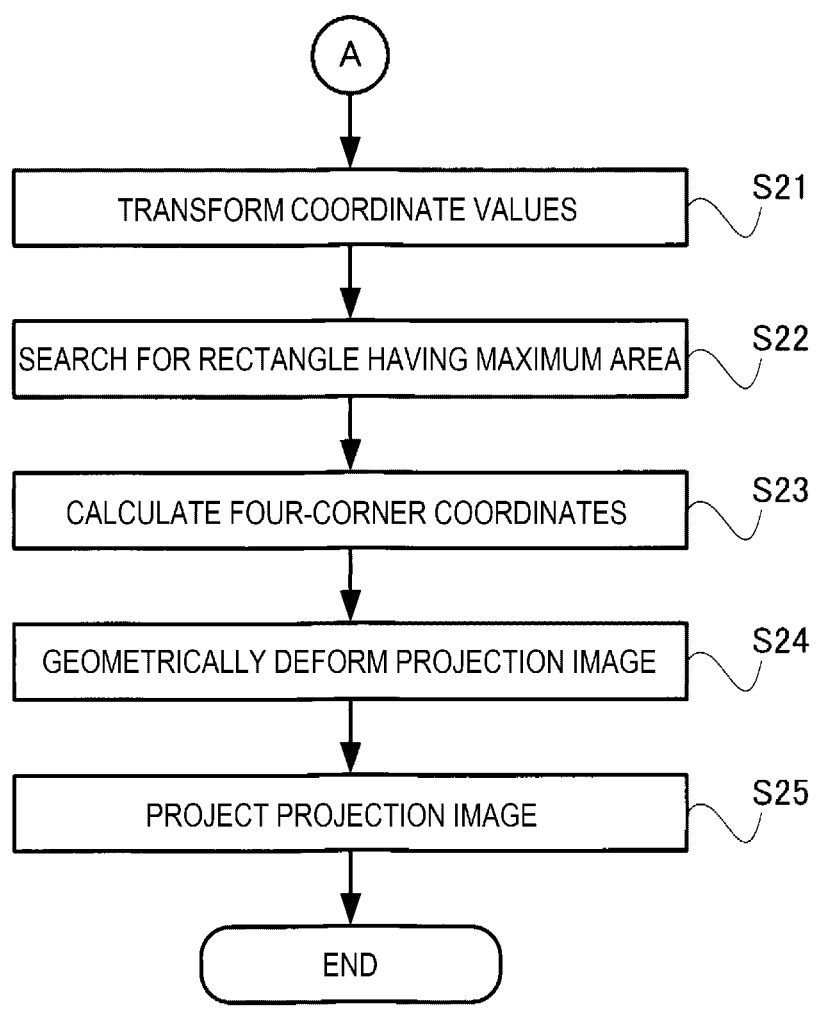
FIG. 15 is a flowchart showing operations of the first projector 10-1.

FIGS. 14 and 15 are flowcharts showing operations of the first projector 10-1 according to the first embodiment. Hereinafter, the operations of the first projector 10-1 will be described with reference to FIGS. 14 and 15.

In step S11, the processing device 12 functions as the projection controller 126. The processing device 12 causes the projection device 11 to project a pattern image onto the projection surface PF. Similarly, the processing device 12 causes the second projector 10-2 to project a pattern image onto the projection surface PF.

In step S12, the processing device 12 functions as the first captured image acquirer 122-1A and the second captured image acquirer 122-1B. The processing device 12 acquires a captured image of the pattern image captured by the first imaging device 20-1. Further, the processing device 12 acquires a captured image of the pattern image captured by the second imaging device 20-2. The processing device 12 further functions as the correspondence acquirer 122-1. The processing device 12 acquires the correspondence between the first camera image coordinate system and the first panel image coordinate system, the correspondence between the first camera image coordinate system and the second panel image coordinate system, a correspondence between the second camera image coordinate system and the first panel image coordinate system, and a correspondence between the second camera image coordinate system and the second panel image coordinate system.

In step S13, the processing device 12 functions as the axial direction detector 122-2. The processing device 12 detects, in the camera image coordinate system, the panel horizontal central axis direction that is the direction of the axis corresponding to the horizontal central axis in the panel image coordinate system.

In step S14, the processing device 12 functions as the plane posture estimator 122-3. The processing device 12 estimates the posture of the projection surface PF with respect to the first imaging device 20-1.

In step S15, the processing device 12 functions as the plane transform unit 123. The processing device 12 transforms the two-dimensional panel horizontal central axis direction vector in the camera image coordinate system into the three-dimensional panel horizontal central axis direction vector on the projection surface PF by using the plane parameters of the projection surface PF.

In step S16, the processing device 12 functions as the normal direction acquirer 124-1. The processing device 12 acquires the normal direction of the projection surface PF.

In step S17, the processing device 12 functions as the vertical direction acquirer 124-2. The processing device 12 acquires the vertical direction of the projection surface PF.

In step S18, the processing device 12 functions as the horizontal direction acquirer 124-3. The processing device 12 acquires the horizontal direction of the projection surface PF.

In step S19, the processing device 12 functions as the transformation matrix calculator 125-1. The processing device 12 calculates the transformation matrix from the first camera coordinate system that is the three-dimensional coordinate system viewed from the first imaging device 20-1 to the three-dimensional coordinate system when the projection surface PF is viewed from the front surface.

In step S20, the processing device 12 functions as the projection region detector 125-2. The processing device 12 detects the projection region of each projector 10 on the captured image captured by the first imaging device 20-1.

In step S21, the processing device 12 functions as the coordinate system transform unit 125-3. The processing device 12 transforms the coordinate values of the projection region in the first camera image coordinate system into the coordinate values in the projection surface coordinate system.

In step S22, the processing device 12 functions as the search unit 125-4. The processing device 12 searches for the rectangle SQ having the maximum area inscribed in the entire region which is the sum of the projection region AR1 of the first projector 10-1 and the projection region AR2 of the second projector 10-2.

In step S23, the processing device 12 functions as the coordinate value calculator 125-5. The processing device 12 calculates coordinate values of the four corners of the rectangle SQ1' in the first panel image coordinate system of the first projector 10-1 and the coordinate values of the four corners of the rectangle SQ2' in the second panel image coordinate system of the second projector 10-2 by using the coordinate values of the four corners of the corrected coupling region stored by the search unit 125-4.

In step S24, the processing device 12 functions as the geometric deformation unit 125-6. The processing device 12 geometrically deforms the projection image by using the corrected four-corner coordinates of the rectangle SQ1' and the corrected four-corner coordinates of the rectangle SQ2'.

In step S25, the processing device 12 functions as the projection controller 126. The processing device 12 causes the projection device 11 and the second projector 10-2 to project the adjusted projection image toward the projection surface PF.

2: Modifications

The present disclosure is not limited to the embodiment described above. Specific modifications will be described below.

2-1: Modification 1

In the embodiment described above, the transformation matrix acquirer 122-3A calculates and acquires a projective transformation matrix from the first camera normalized coordinate system to the second camera normalized coordinate system. However, the projective transformation matrix calculated and acquired by the transformation matrix acquirer 122-3A is not limited to the projective transformation matrix from the first camera normalized coordinate system to the second camera normalized coordinate system.

For example, the transformation matrix acquirer 122-3A may calculate and acquire a projective transformation matrix from a first panel image coordinate system in the projection device 11 included in the first projector 10-1 to the first camera normalized coordinate system. In this case, the first imaging device 20-1 is an example of a "first device". The projection device 11 included in the first projector 10-1 is an example of a "first projection device". The first panel image coordinate system is an example of a "third coordinate system". The first camera normalized coordinate system is an example of a "first coordinate system".

Alternatively, the transformation matrix acquirer 122-3A may calculate and acquire a projective transformation matrix from the first camera normalized coordinate system to the first panel image coordinate system of the projection device 11 included in the first projector 10-1. In this case, the first imaging device 20-1 is an example of the "first device". The projection device 11 included in the first projector 10-1 is an example of the "first projection device". The first camera normalized coordinate system is an example of the "first coordinate system". The "first panel image coordinate system" is an example of the "third coordinate system".

Alternatively, the transformation matrix acquirer 122-3A may calculate and acquire a projective transformation matrix from the first panel image coordinate system in the projection device 11 included in the first projector 10-1 to a second panel image coordinate system in the projection device 11 included in the second projector 10-2. In this case, the projection device 11 included in the first projector 10-1 is an example of the "first projection device". The projection device 11 included in the second projector 10-2 is an example of the "second device". The first panel image coordinate system is an example of the "first coordinate system". The second panel image coordinate system is an example of a "second coordinate system".

Alternatively, the transformation matrix acquirer 122-3A may calculate and acquire a projective transformation matrix from the second panel image coordinate system in the projection device 11 included in the second projector 10-2 to the first panel image coordinate system in the projection device 11 included in the first projector 10-1.

Alternatively, the transformation matrix acquirer 122-3A may calculate and acquire a projective transformation matrix from the first camera normalized coordinate system to the second panel image coordinate system of the projection device 11 included in the second projector 10-2. In this case, the first imaging device 20-1 is an example of the "first device". The projection device 11 included in the second projector 10-2 is an example of the "second device". The first camera normalized coordinate system is an example of the "first coordinate system". The "second panel image coordinate system" is an example of the "second coordinate system".

Alternatively, the transformation matrix acquirer 122-3A may calculate and acquire a projective transformation matrix from the second panel image coordinate system in the projection device 11 included in the second projector 10-2 to the first camera normalized coordinate system. In this case, the projection device 11 included in the second projector 10-2 is an example of the "first device". The first imaging device 20-1 is an example of the "second device". The "second panel image coordinate system" is an example of the "first coordinate system". The first camera normalized coordinate system is an example of the "second coordinate system".

Alternatively, the transformation matrix acquirer 122-3A may calculate and acquire a projective transformation matrix from the first camera image coordinate system to the second camera image coordinate system. In this case, the first imaging device 20-1 is an example of the "first device". The second imaging device 20-2 is an example of the "second device". The first camera image coordinate system is an example of the "first coordinate system". The second camera image coordinate system is an example of the "second coordinate system". In this case, the transformation from the first camera image coordinate system to the first camera normalized coordinate system and the transformation from the second camera image coordinate system to the second camera normalized coordinate system are not essential operations.

2-2: Modification 2

In the embodiment described above, the processing device 12 included in the first projector 10-1 includes the acquirer 121, the three-dimensional shape calculator 122, the plane transform unit 123, the direction acquirer 124, the adjuster 125, and the projection controller 126 as functional blocks. However, an information processing device that is coupled to the communication network NET and is separate from the first projector 10-1 may include one or more of these functional blocks. The information processing device may be any one of a PC, a smartphone, and a tablet. Alternatively, these functional blocks may be distributed as applications to a terminal device coupled to the communication network NET.

2-3: Modification 3

In the embodiment described above, the projection system 1 includes two projectors 10 including the first projector 10-1 and the second projector 10-2. However, the projection system 1 may include any number of projectors 10.

When the projection system 1 includes only one first projector 10-1, a first direction indicated by the three-dimensional panel horizontal central axis direction vector HV1 according to the first projector 10-1 on the projection surface PF is a vertical direction.

2-4: Modification 4

In the embodiment described above, the first projector 10-1 and the first imaging device 20-1 are separate from each other. However, the first projector 10-1 and the first imaging device 20-1 may be implemented as a single device housed in the same housing. The same applies to the second projector 10-2 and the second imaging device 20-2.

2-5: Modification 5

In the embodiment described above, the projection system 1 may use a stereo camera including two imaging devices instead of the first imaging device 20-1 and the second imaging device 20-2. Alternatively, the projection system 1 may use a TOF camera capable of performing three-dimensional measurement by itself instead of the first imaging device 20-1 and the second imaging device 20-2.

3. Summary of Present Disclosure

Hereinafter, a summary of the present disclosure will be added.

(Appendix 1) A projection image adjustment method includes: acquiring a first captured image corresponding to a first device including a first lens by capturing an image of a plane projection surface on which a first pattern image including at least four unit images is projected from a first projection device; acquiring a second captured image corresponding to a second device including a second lens by capturing an image of the projection surface; acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device; acquiring a plane parameter of the projection surface by using the projective transformation matrix; and projecting a projection image adjusted based on the plane parameter from the first projection device onto the projection surface. At least one of the first device and the second device is an imaging device.

According to the projection image adjustment method described above, the plane parameter of the projection surface can be acquired by using the projective transformation matrix, and the projection image can be adjusted based on the acquired plane parameter. Therefore, when the user of the projection system 1 uses an external imaging device instead of the imaging unit built into each projector, it is not necessary for the user to manually calibrate parameters related to a positional relationship between the devices. As a result, it is possible to prevent convenience for the user from decreasing.

(Appendix 2) In the projection image adjustment method according to Appendix 1, acquiring the projective transformation matrix includes: acquiring, in the first captured image, a first transformation coordinate value group obtained by transforming each coordinate value of the at least four unit images located in the first coordinate system into a coordinate value in a normalized coordinate system in the first device; acquiring, in the second captured image, a second transformation coordinate value group obtained by transforming each coordinate value of the at least four unit images located in the second coordinate system into a coordinate value in a normalized coordinate system in the second device; and acquiring the projective transformation matrix for transforming at least four coordinate values included in the first transformation coordinate value group to at least four coordinate values that correspond one-to-one with the at least four coordinate values and are included in the second transformation coordinate value group.

According to the projection image adjustment method described above, the first projector 10-1 can acquire the projective transformation matrix between the normalized coordinate system of the first device and the normalized coordinate system of the second device. The first projector 10-1 can acquire the plane parameter by decomposing the projective transformation matrix even when an imaging device whose external parameter is unknown is used.

(Appendix 3) In the projection image adjustment method according to Appendix 1, acquiring the projective transformation matrix includes: acquiring a first transformed image obtained by transforming the first captured image into an image in a first normalized coordinate system in the first device; acquiring a second transformed image obtained by transforming the second captured image into an image in a second normalized coordinate system in the second device; acquiring a first transformation coordinate value group indicating positions of the at least four unit images included in the first transformed image in the first normalized coordinate system; acquiring a second transformation coordinate value group indicating positions of the at least four unit images included in the second transformed image in the second normalized coordinate system; and acquiring the projective transformation matrix for transforming at least four coordinate values included in the first transformation coordinate value group to at least four coordinate values that correspond one-to-one with the at least four coordinate values and are included in the second transformation coordinate value group.

According to the projection image adjustment method described above, the first projector 10-1 can acquire the projective transformation matrix between the normalized coordinate system of the first device and the normalized coordinate system of the second device. The first projector 10-1 can acquire the plane parameter by decomposing the projective transformation matrix even when an imaging device whose external parameter is unknown is used.

(Appendix 4) The projection image adjustment method according to any one of Appendix 1 to Appendix 3 further includes: acquiring a first direction indicating a direction from the first device to the second device. Acquiring the plane parameter of the projection surface includes: acquiring a first solution and a second solution of a formula using the projective transformation matrix; and acquiring the plane parameter of the projection surface indicated by the first solution when a direction from the first device toward the second device, which is indicated by the first solution, matches the first direction and a direction from the first device toward the second device, which is indicated by the second solution, does not match the first direction.

According to the projection image adjustment method described above, by acquiring the first direction indicating the direction from the first device to the second device, the first projector 10-1 can acquire an optimum plane parameter from the projective transformation matrix.

(Appendix 5) The projection image adjustment method according to Appendix 4 further includes: receiving an operation of designating the first direction from an outside.

According to the projection image adjustment method, the first projector 10-1 can acquire a positional relationship between the imaging devices based on an input from the user.

(Appendix 6) In the projection image adjustment method according to Appendix 4, the first device is a first camera that is disposed at a housing of a first projector and is separated from the first projector, the second device is a second camera that is disposed at a housing of a second projector and is separated from the second projector, the first projector includes the first projection device, and acquiring the first direction includes: acquiring a third captured image obtained by capturing, by the first device, an image of the projection surface onto which a second pattern image projected from the second projector is projected; and acquiring, based on the first captured image and the third captured image, the first direction indicating a direction from the first pattern image to the second pattern image in a captured image coordinate system that defines a position of a captured image captured by the first device.

When the first imaging device 20-1 is attached to the first projector 10-1, it can be assumed that the positional relationship of the projection image corresponds to the positional relationship of the camera. According to the projection image adjustment method, the first projector 10-1 can regard the positional relationship of the projection image as the positional relationship of the camera based on the captured image obtained by capturing an image of the projection image, and can acquire the first direction.

(Appendix 7) A projection system includes: a first projection device; a first device including a first lens and configured to generate a first captured image by capturing an image of a plane projection surface on which a first pattern image including at least four unit images is projected from the first projection device; a second device including a second lens and configured to generate a second captured image by capturing an image of the projection surface; and a processing device that is configured to acquire the first captured image, acquire the second captured image, and acquire, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device, includes a fourth acquirer configured to acquire a plane parameter of the projection surface by using the projective transformation matrix, and is configured to project a projection image adjusted based on the plane parameter from the first projection device onto the projection surface. At least one of the first device and the second device is an imaging device.

According to the projection system described above, the plane parameter of the projection surface can be acquired by using the projective transformation matrix, and the projection image can be adjusted based on the acquired plane parameter. Therefore, when the user uses an external imaging device instead of the imaging unit built into each projector, it is not necessary for the user to manually calibrate parameters related to a positional relationship between the devices. As a result, it is possible to prevent convenience for the user from decreasing.

(Appendix 8) A non-transitory computer-readable storage medium stores an information processing program, and the information processing program causes a computer to execute operations including: acquiring a first captured image corresponding to a first device including a first lens by capturing an image of a plane projection surface on which a first pattern image including at least four unit images is projected from a first projection device; acquiring a second captured image corresponding to a second device including a second lens by capturing an image of the projection surface; acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device; acquiring a plane parameter of the projection surface by using the projective transformation matrix; and projecting a projection image adjusted based on the plane parameter from the first projection device onto the projection surface. At least one of the first device and the second device is an imaging device.

According to the non-transitory computer-readable storage medium storing an information processing program described above, the plane parameter of the projection surface can be acquired by using the projective transformation matrix, and the projection image can be adjusted based on the acquired plane parameter. Therefore, when the user of the projection system 1 uses an external imaging device instead of the imaging unit built into each projector, it is not necessary for the user to manually calibrate parameters related to a positional relationship between the devices. As a result, it is possible to prevent convenience for the user from decreasing.

What is claimed is:

1. A projection image adjustment method comprising:
    acquiring a first captured image corresponding to a first device including a first lens by capturing an image of a plane projection surface on which a first pattern image including at least four unit images is projected from a first projection device;
    acquiring a second captured image corresponding to a second device including a second lens by capturing an image of the projection surface;
    acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device;
    acquiring a plane parameter of the projection surface by using the projective transformation matrix, the plane parameter defining a three-dimensional shape of the projection surface;
    projecting a projection image adjusted based on the plane parameter from the first projection device onto the projection surface; and
    acquiring a first direction indicating a direction from the first device to the second device, wherein
    at least one of the first device and the second device is an imaging device, and
    acquiring the plane parameter of the projection surface includes:
        acquiring a first solution and a second solution of based on the projective transformation matrix, the first solution and the second solution including a position of the second device with respect to the first device, a position of the first device with respect to the first projection device or a position of the first projection device with respect to the first device; and
        acquiring the plane parameter of the projection surface indicated by the first solution when a direction from the first device toward the second device, which is indicated by the first solution, matches the first direction and a direction from the first device toward the second device, which is indicated by the second solution, does not match the first direction.

2. The projection image adjustment method according to claim 1, wherein
    acquiring the projective transformation matrix includes:
        acquiring, in the first captured image, a first transformation coordinate value group obtained by transforming each coordinate value of the at least four unit images located in the first coordinate system into a coordinate value in a normalized coordinate system in the first device;
        acquiring, in the second captured image, a second transformation coordinate value group obtained by transforming each coordinate value of the at least four unit images located in the second coordinate system into a coordinate value in a normalized coordinate system in the second device; and
acquiring the projective transformation matrix for transforming at least four coordinate values included in the first transformation coordinate value group to at least four coordinate values that correspond one-to-one with the at least four coordinate values and are included in the second transformation coordinate value group.

3. The projection image adjustment method according to claim 1, wherein
acquiring the projective transformation matrix includes:
acquiring a first transformed image obtained by transforming the first captured image into an image in a first normalized coordinate system in the first device;
acquiring a second transformed image obtained by transforming the second captured image into an image in a second normalized coordinate system in the second device;
acquiring a first transformation coordinate value group indicating positions of the at least four unit images included in the first transformed image in the first normalized coordinate system;
acquiring a second transformation coordinate value group indicating positions of the at least four unit images included in the second transformed image in the second normalized coordinate system; and
acquiring the projective transformation matrix for transforming at least four coordinate values included in the first transformation coordinate value group to at least four coordinate values that correspond one-to-one with the at least four coordinate values and are included in the second transformation coordinate value group.

4. The projection image adjustment method according to claim 1, further comprising:
receiving an operation of designating the first direction from a user.

5. The projection image adjustment method according to claim 1, wherein
the first device is a first camera that is disposed at a housing of a first projector and is separated from the first projector,
the second device is a second camera that is disposed at a housing of a second projector and is separated from the second projector,
the first projector includes the first projection device, and
acquiring the first direction includes:
acquiring a third captured image obtained by capturing, by the first device, an image of the projection surface onto which a second pattern image projected from the second projector is projected; and
acquiring, based on the first captured image and the third captured image, the first direction indicating a direction from the first pattern image to the second pattern image in a captured image coordinate system that defines a position of a captured image captured by the first device.

6. A non-transitory computer-readable storage medium storing an information processing program, the information processing program causing a computer to execute operations comprising:
acquiring a first captured image corresponding to a first device including a first lens by capturing an image of a plane projection surface on which a first pattern image including at least four unit images is projected from a first projection device;
acquiring a second captured image corresponding to a second device including a second lens by capturing an image of the projection surface;
acquiring, based on the first captured image and the second captured image, a projective transformation matrix indicating any one of transformation from a first coordinate system in the first device to a second coordinate system in the second device, transformation from a third coordinate system in the first projection device to the first coordinate system in the first device, and transformation from the first coordinate system in the first device to the third coordinate system in the first projection device;
acquiring a plane parameter of the projection surface by using the projective transformation matrix, the plane parameter defining a three-dimensional shape of the projection surface;
projecting a projection image adjusted based on the plane parameter from the first projection device onto the projection surface; and
acquiring a first direction indicating a direction from the first device to the second device, wherein
at least one of the first device and the second device is an imaging device, and
acquiring the plane parameter of the projection surface includes:
acquiring a first solution and a second solution of based on the projective transformation matrix, the first solution and the second solution including a position of the second device with respect to the first device, a position of the first device with respect to the first projection device or a position of the first projection device with respect to the first device; and
acquiring the plane parameter of the projection surface indicated by the first solution when a direction from the first device toward the second device, which is indicated by the first solution, matches the first direction and a direction from the first device toward the second device, which is indicated by the second solution, does not match the first direction.

* * * * *